United States Patent
Na et al.

(10) Patent No.: US 10,228,587 B2
(45) Date of Patent: Mar. 12, 2019

(54) LIQUID CRYSTAL DISPLAY PANEL AND MANUFACTURING METHOD THEREOF

(71) Applicant: Samsung Display Co., Ltd., Yongin-si, Gyeonggi-do (KR)

(72) Inventors: Byoung Sun Na, Seoul (KR); Hee June Kwak, Yongin-si (KR); Seok Kyu Yoon, Asan-si (KR); Sang-Uk Lim, Yongin-si (KR); Seung Soo Baek, Hwaseong-si (KR); Seong Young Lee, Hwaseong-si (KR); Wan-Soon Im, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/823,146

(22) Filed: Nov. 27, 2017

(65) Prior Publication Data
US 2018/0081237 A1     Mar. 22, 2018

Related U.S. Application Data

(62) Division of application No. 15/478,962, filed on Apr. 4, 2017, now Pat. No. 9,851,600, which is a division of application No. 14/568,525, filed on Dec. 12, 2014, now Pat. No. 9,632,351.

(30) Foreign Application Priority Data

Jul. 30, 2014  (KR) .................. 10-2014-0097531

(51) Int. Cl.
| | | |
|---|---|---|
| *G02F 1/1335* | (2006.01) | |
| *G02F 1/1339* | (2006.01) | |
| *G02F 1/1333* | (2006.01) | |
| *G02F 1/1362* | (2006.01) | |

(52) U.S. Cl.
CPC ...... *G02F 1/133514* (2013.01); *G02F 1/1339* (2013.01); *G02F 1/13394* (2013.01);
(Continued)

(58) Field of Classification Search
CPC .............. G02F 1/13394; G02F 1/1335; G02F 1/133514; G02F 1/133512;
(Continued)

(56) References Cited

U.S. PATENT DOCUMENTS

| | | |
|---|---|---|
| 6,493,050 B1 | 12/2002 | Lien et al. |
| 8,107,039 B2 | 1/2012 | Kim et al. |

(Continued)

FOREIGN PATENT DOCUMENTS

| | | |
|---|---|---|
| JP | 2011-170177 | 9/2011 |
| KR | 1020040080778 A | 9/2004 |

(Continued)

OTHER PUBLICATIONS

European Search Report corresponding to EP Application No. 15171636.2, dated Nov. 18, 2015, 9 pages.

*Primary Examiner* — Thoi V Duong
(74) *Attorney, Agent, or Firm* — Innovation Counsel LLP

(57) ABSTRACT

Provided are a liquid crystal display panel and a manufacturing method thereof, and more particularly, a liquid crystal display panel including white pixels and a manufacturing method thereof. The liquid crystal display panel includes: a first substrate and a second substrate facing each other; a liquid crystal layer positioned between the first substrate and the second substrate; a plurality of color filters positioned on the first substrate and representing different colors from each other, in which at least two of the plurality of color filters overlap with each other on the first substrate to form an overlapping portion, and the overlapping portion forms a first spacer; a transparent filter positioned on the first substrate and positioned in a transmitting area of a white pixel; and a second spacer including the same material as the transparent filter.

12 Claims, 48 Drawing Sheets

(52) U.S. Cl.
CPC .. *G02F 1/133305* (2013.01); *G02F 1/133345* (2013.01); *G02F 1/133512* (2013.01); *G02F 1/133516* (2013.01); *G02F 2001/13396* (2013.01); *G02F 2001/13398* (2013.01); *G02F 2001/136222* (2013.01)

(58) Field of Classification Search
CPC ......... G02F 1/133345; G02F 1/136209; G02F 1/1343; G02F 1/134336; G02F 1/1339; G02F 1/133711; G02F 1/1333; G02F 2001/13396; G02F 2001/133519; G02F 2001/13398; G02F 2201/52; H01L 27/3218; H01L 27/322; H01L 51/5284
See application file for complete search history.

(56) References Cited

U.S. PATENT DOCUMENTS

| | | |
|---|---|---|
| 8,698,995 B2 | 4/2014 | Yoshida et al. |
| 2004/0179160 A1 | 9/2004 | Rhee et al. |
| 2005/0117092 A1 | 6/2005 | Park |
| 2006/0208293 A1 | 9/2006 | Lim et al. |
| 2010/0085515 A1* | 4/2010 | Kim ............ G02F 1/133514 349/106 |
| 2010/0110355 A1 | 5/2010 | Okazaki |
| 2012/0188494 A1 | 7/2012 | Yoshida |
| 2012/0249940 A1 | 10/2012 | Choi |
| 2013/0293799 A1 | 11/2013 | Lee et al. |
| 2015/0200211 A1 | 7/2015 | Hong |

FOREIGN PATENT DOCUMENTS

| | | |
|---|---|---|
| KR | 1020050051524 A | 6/2005 |
| KR | 1020050064176 A | 6/2005 |
| KR | 1020050064358 A | 6/2005 |
| KR | 1020060044263 A | 5/2006 |
| KR | 1020060075814 A | 7/2006 |
| KR | 1020070042134 A | 4/2007 |
| KR | 1020100038617 A | 4/2010 |
| KR | 1020110100842 A | 9/2011 |
| KR | 1020130015735 A | 2/2013 |

\* cited by examiner

LIQUID CRYSTAL DISPLAY PANEL AND MANUFACTURING METHOD THEREOF

CROSS-REFERENCE TO RELATED APPLICATION

This application is a divisional application of U.S. patent application Ser. No. 15/478,962 filed on Apr. 4, 2017, which is a divisional application of U.S. patent application Ser. No. 14/568,525 filed on Dec. 12, 2014, which claims priority to Korean Patent Application No. 10-2014-0097531, filed on Jul. 30, 2014 in the Korean Intellectual Property Office (KIPO), and all the benefits accruing therefrom under 35 U.S.C. § 119, the contents of the prior applications being herein incorporated by reference.

BACKGROUND

(a) Technical Field

The present application relates to a liquid crystal display panel and a manufacturing method thereof, and more particularly, to a liquid crystal display panel including white pixels and a manufacturing method thereof.

(b) Description of the Related Art

A liquid crystal display is a typical light-receiving type display device as one of display devices which are widely used presently. The liquid crystal display includes a liquid crystal display panel including a plurality of pixels and a backlight unit supplying light to the liquid crystal display panel. The liquid crystal display panel includes a liquid crystal layer and a field generating electrode generating an electric field in the liquid crystal layer.

The field generating electrode includes a pixel electrode and an opposed electrode. The pixel electrode is connected to a switching element such as a thin film transistor (TFT) to receive a data voltage corresponding to an input image signal. The opposed electrode may receive a common voltage and may be formed over the entire surface of the display panel. The intensity of the electric field generated in the liquid crystal layer is controlled by applying the voltages to the pixel electrode and the opposed electrode to rearrange liquid crystal molecules, and as a result, a desired image may be displayed by controlling an amount of transmitted light.

The liquid crystal display includes two substrates facing each other with the liquid crystal layer therebetween, and in this case, the field generating electrodes may be provided on two substrates facing each other, respectively, and the two field generating electrodes may be positioned on one substrate.

For example, the pixel electrode receiving the data voltage in the field generating electrodes and a plurality of thin film transistors are arranged on one of two substrates facing each other, and a plurality of color filters representing basic colors such as red, green, and blue and a light blocking member which may prevent light leakage between the pixels may be formed on the other substrate. Unlike this, at least one of the light blocking member and the color filter may be formed on the same substrate as the pixel electrode and the thin film transistor.

The liquid crystal display includes red pixels, green pixels, and blue pixels which may display images of red, green, and blue which are the primary colors, respectively. The red pixel, the green pixel, and the blue pixel form one dot and may implement various color displays by controlling luminance of each pixel. However, since the red pixel, the green pixel, and the blue pixel include color filters, an amount of light emitted from the backlight is decreased by passing through the color filters, and as a result, the luminance of the image deteriorates. In order to solve the problem, the liquid crystal display further includes white pixels representing white because color filters are not included, in addition to the pixels representing the basic colors. The white pixel does not include the color filter, and as a result, the luminance of the image may be increased.

The above information disclosed in this Background section is only for enhancement of understanding of the background and therefore it may contain information that does not form the prior art that is already known in this country to a person of ordinary skill in the art.

SUMMARY

In the case where a liquid crystal display includes white pixels, generally, a material such as a resin for a white filter is deposited on the entire surface of a substrate and then needs to be patterned by a method such as a photolithography process. Accordingly, in the case of adding the white pixels, luminance may be increased, but the photolithography process is added, and as a result, a processing time, processing cost, and the like are increased, and a manufacturing process is complicated.

Embodiments have been made in an effort to reduce a manufacturing time, manufacturing cost, and the like by simplifying a manufacturing process of a liquid crystal display including white pixels.

An exemplary embodiment provides a liquid crystal display panel including: a first substrate and a second substrate facing each other; a liquid crystal layer positioned between the first substrate and the second substrate; a plurality of color filters positioned on the first substrate and representing different colors from each other, at least two of the plurality of color filters overlap with each other on the first substrate to form an overlapping portion, and the overlapping portion forms a first spacer; a transparent filter positioned on the first substrate and positioned in a transmitting area of a white pixel; and a second spacer including the same material as the transparent filter.

Another exemplary embodiment provides a liquid crystal display panel including: a first substrate and a second substrate facing each other; a liquid crystal layer positioned between the first substrate and the second substrate; a plurality of color filters positioned on the first substrate and representing different colors from each other; and a passivation layer positioned on the first substrate and the color filters and including an organic material, in which at least two of the plurality of color filters overlap with each other on the first substrate to form an overlapping portion, the overlapping portion forms a spacer, a thickness of the passivation layer positioned in a transmitting area of a white pixel is larger than or substantially the same as a thickness of a color filter of the color filters positioned in a transmitting area of a color pixel, and the thickness of the passivation layer positioned in the transmitting area of the white pixel is larger than a thickness of the passivation layer positioned in the transmitting area of the color pixel.

Yet another exemplary embodiment provides a liquid crystal display panel including: a first substrate and a second substrate facing each other; a liquid crystal layer positioned between the first substrate and the second substrate; and a plurality of color filters positioned on the first substrate and representing different colors from each other, in which the plurality of color filters includes at least two color filters in white positioned in a transmitting area of a white pixel and representing different colors from each other, and two or more of the at least two color filters in white overlap with each other in the transmitting area of the white pixel to form an overlapping portion in white.

Still another exemplary embodiment provides a manufacturing method of a liquid crystal display panel including: forming a plurality of color filters representing different colors on a first substrate; and forming a transparent filter and a transparent spacing member on the first substrate through a same process, in which at least two of the plurality of color filters overlap with each other on the first substrate to form an overlapping portion which protrudes above the first substrate.

Still another exemplary embodiment provides a manufacturing method of a liquid crystal display panel including: forming a plurality of color filters representing different colors from each other on a first substrate; and forming a passivation layer including an organic material on the first substrate, in which at least two of the plurality of color filters overlap with each other on the first substrate to form an overlapping portion which protrudes above the first substrate, a thickness of the passivation layer positioned in a transmitting area of a white pixel is larger than or substantially the same as a thickness of a color filter of the color filters positioned in a transmitting area of a color pixel, and the thickness of the passivation layer positioned in the transmitting area of the white pixel is larger than a thickness of the passivation layer positioned in the transmitting area of the color pixel.

Still another exemplary embodiment provides a manufacturing method of a liquid crystal display panel including: forming a plurality of color filters representing different colors from each other on a first substrate, in which the plurality of color filters includes at least two color filters in white which are positioned in a transmitting area of a white pixel and representing different colors from each other, and two or more of the at least two color filters in white overlap with each other in the transmitting area of the white pixel to form an overlapping portion in white.

According to the exemplary embodiments, a manufacturing process of the liquid crystal display panel including white pixels is simplified to reduce a manufacturing time, manufacturing costs, and the like.

DETAILED DESCRIPTION OF THE EMBODIMENTS

Figure 1A:
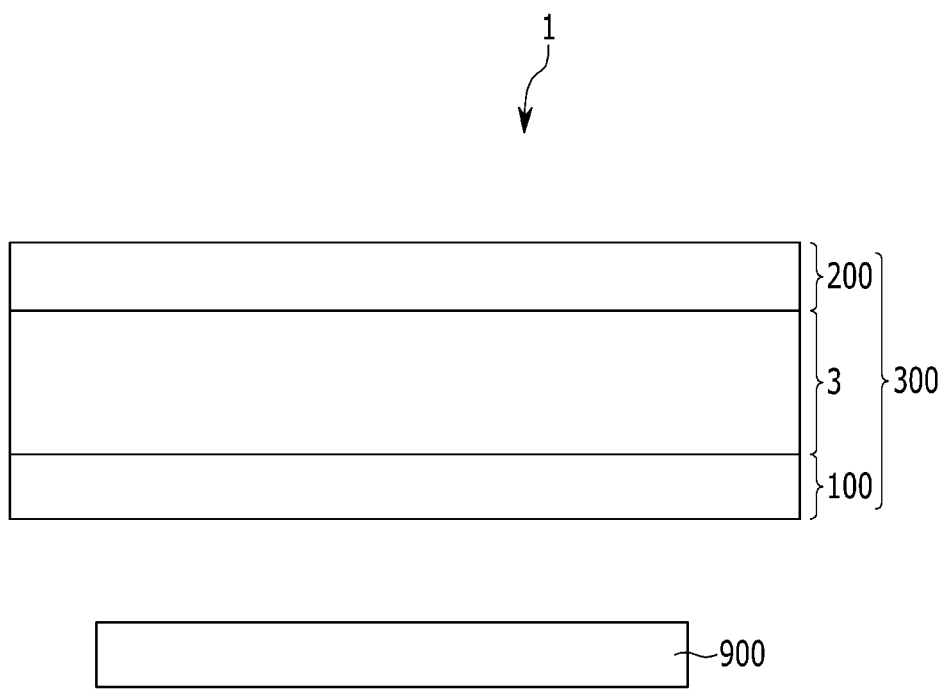
FIG. 1A is a schematic cross-sectional view of a liquid crystal display panel according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

First, a liquid crystal display including a liquid crystal display panel according to an exemplary embodiment will be described with reference to FIG. 1A.

Referring to FIG. 1A, a liquid crystal display 1 according to an exemplary embodiment includes a liquid crystal display panel 300 and a backlight unit 900 supplying light to the liquid crystal display panel 300. The light supplied by the backlight unit 900 may be white light, and also be light of a basic color having a predetermined wavelength.

The liquid crystal display panel 300 includes a thin film transistor panel 100 and an opposed panel 200 facing each other, and a liquid crystal layer 3 positioned between the two panels 100 and 200. Although not illustrated, when viewed on a plane, the liquid crystal display panel 300 according the exemplary embodiment includes a display area displaying an image, and the display area includes a plurality of pixels. Herein, viewing the liquid crystal display panel 300 on the plane means that the liquid crystal display panel 300 is viewed from an observing direction in a vertical direction to an upper surface or a lower surface of the liquid crystal display panel 300.

The thin film transistor panel 100 includes a plurality of thin film transistors and a plurality of signal lines connected thereto. The signal lines may include a gate line transferring a gate signal to the thin film transistor and a data line transferring a data signal to the thin film transistor. The thin film transistor, as a switching element, may be controlled according to the gate signal to transfer a data voltage of the data line.

A plurality of color filters may be positioned on the opposed panel 200, but is not limited thereto. The color filters may transmit light of a color having a predetermined wavelength, not white, and may include a plurality of basic color filters for implementing a color display. An example of the basic color may include the three primary colors of red, green, and blue. The color filter may be positioned on the thin film transistor panel 100.

The liquid crystal layer 3 includes liquid crystal molecules (not illustrated). The liquid crystal layer 3 may have positive dielectric anisotropy or negative dielectric anisotropy. When an electric field is not applied to the liquid crystal layer 3, the liquid crystal molecules may be aligned so that long axes are almost horizontal or vertical to the surface of the thin film transistor panel 100 or the opposed panel 200. To this end, an alignment layer may be formed on an inner surface of the thin film transistor panel 100 or the opposed panel 200. The alignment layer may be formed by a method of physical treatment such as rubbing, optical treatment such as light irradiation, or a chemical treatment after coating an aligning agent on the inner surface of the panel. Further, the alignment layer or the liquid crystal layer 3 may include an alignment assisting means such as a polymer for aligning the liquid crystal molecules or giving a pretilt. The alignment assisting means may be formed by an optical or chemical method.

The thin film transistor panel 100 according to the exemplary embodiment includes a pixel electrode (not illustrated) receiving a data voltage through the thin film transistor. The opposed panel 200 or the thin film transistor panel 100 includes an opposed electrode (not illustrated). Both the pixel electrode and the opposed electrode are field generating electrodes which may generate the electric field in the liquid crystal layer 3. When the voltages are applied to the pixel electrode and the opposed electrode, the electric field is generated in the liquid crystal layer 3, and the liquid crystal molecules are rearranged. The rearrangement degree of the liquid crystal molecules may be controlled by controlling the intensity of the electric field generated in the liquid crystal layer 3, and as a result, a change degree of polarization of light passing through the liquid crystal layer 3 may be controlled. Then, the light passing through the liquid crystal layer 3 may control transmittance through a polarizer and the like to display an image.

Next, a detailed structure of the opposed panel 200 included in the liquid crystal display panel according to the exemplary embodiment will be described with reference to FIGS. 1B and 2 to 9 in addition to FIG. 1A.

Figure 1B:
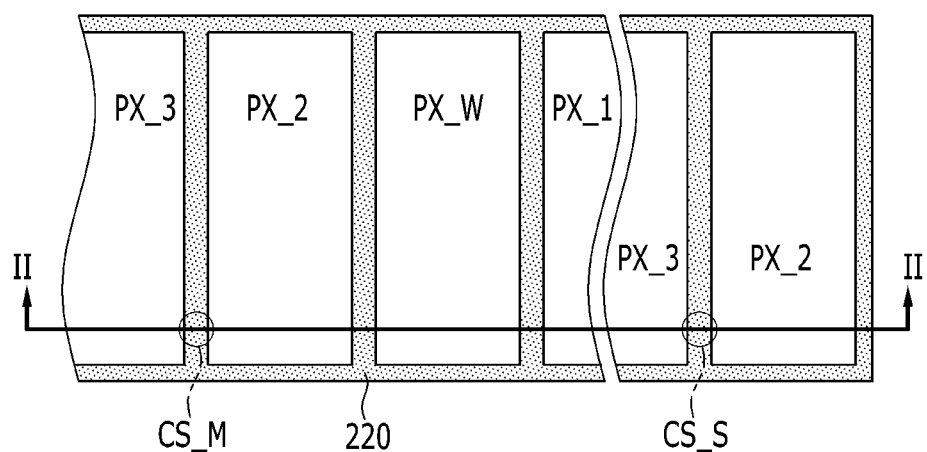
FIG. 1B is a layout view of the liquid crystal display panel according to the exemplary embodiment.
Figure 6:
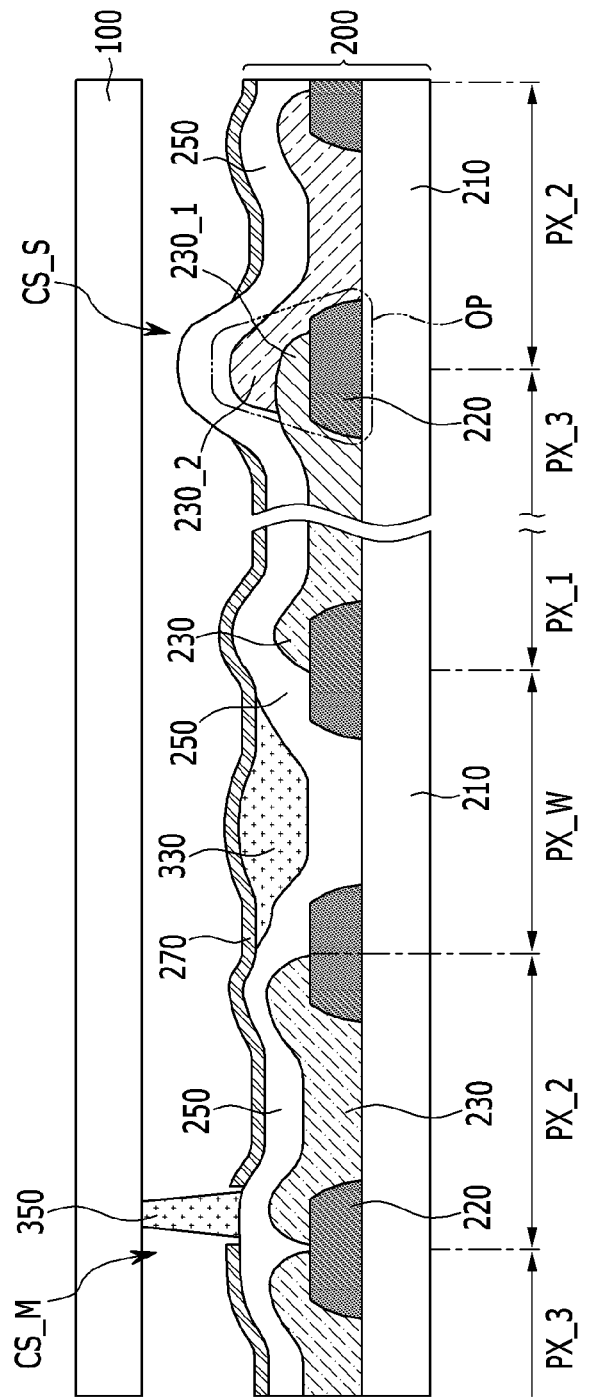
Figure 7:
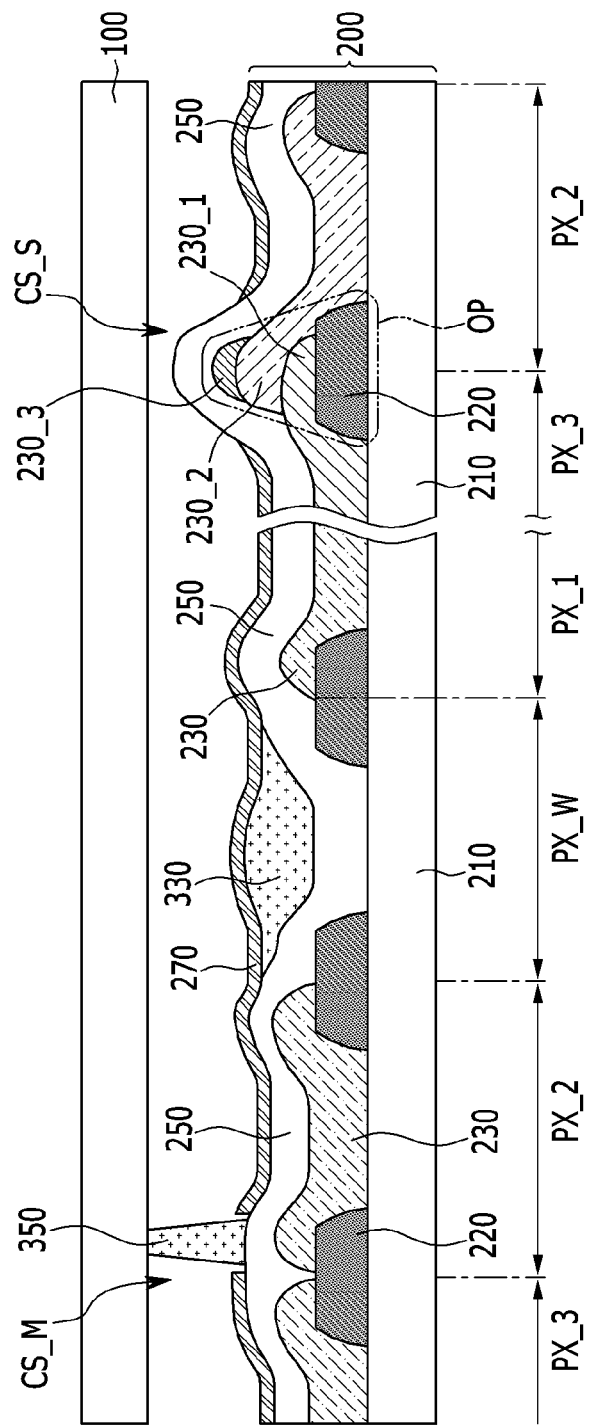
Figure 8A:
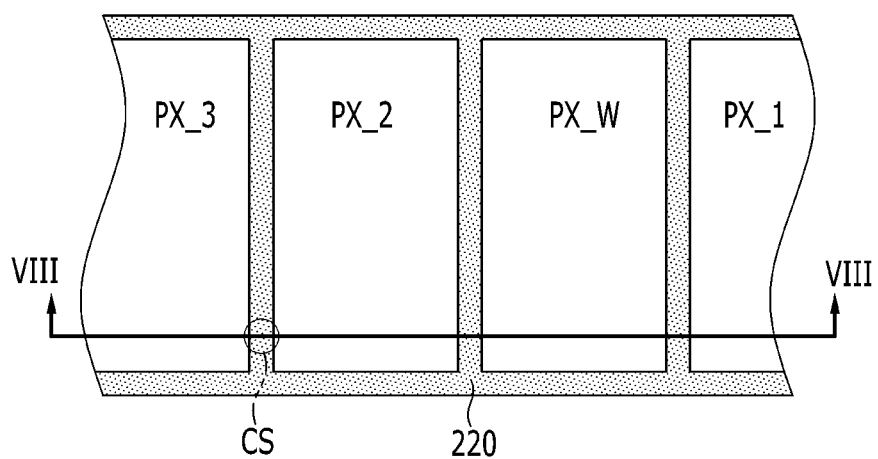
FIG. 8A is a layout view of a liquid crystal display panel according to another exemplary embodiment.
Figure 8B:
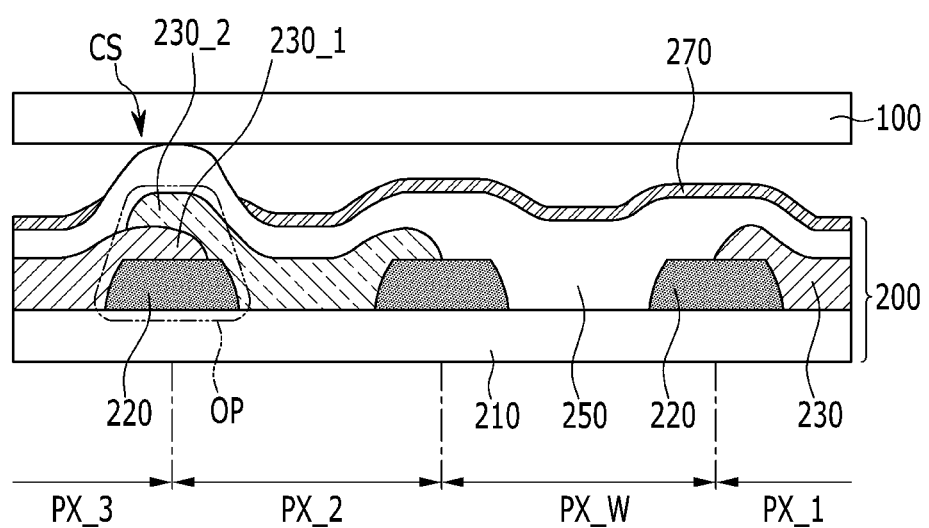
FIGS. 8B and 9 are cross-sectional views illustrating the liquid crystal display panel illustrated in FIG. 8A taken along line VIII-VIII, respectively.
Figure 9:
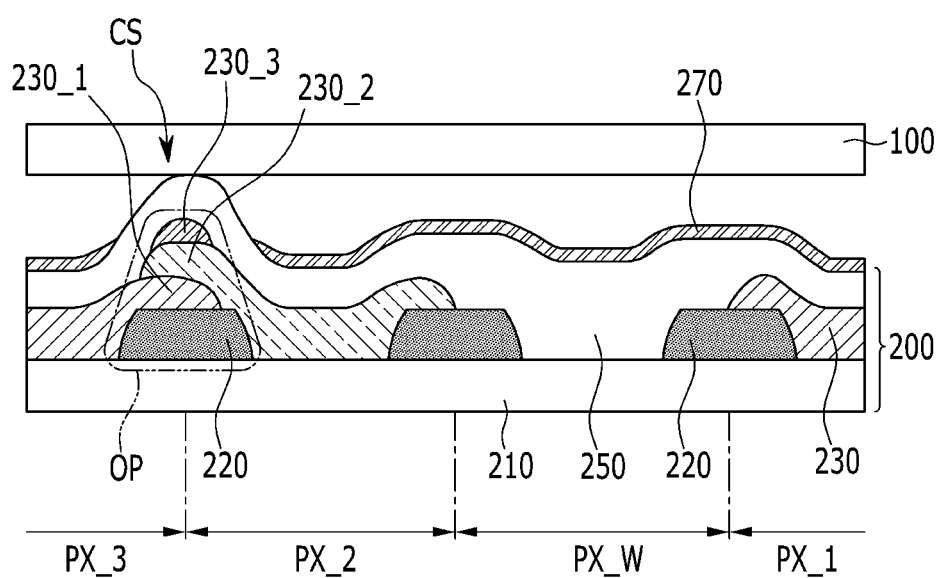

FIG. 1B is a layout view of the liquid crystal display panel according to the exemplary embodiment, FIGS. 2 to 7 are cross-sectional views illustrating the liquid crystal display panel illustrated in FIG. 1B taken along line II-II, respectively, FIG. 8A is a layout view of a liquid crystal display panel according to another exemplary embodiment, and FIGS. 8B and 9 are cross-sectional views illustrating the liquid crystal display panel illustrated in FIG. 8A taken along line VIII-VIII, respectively.

Figure 2:
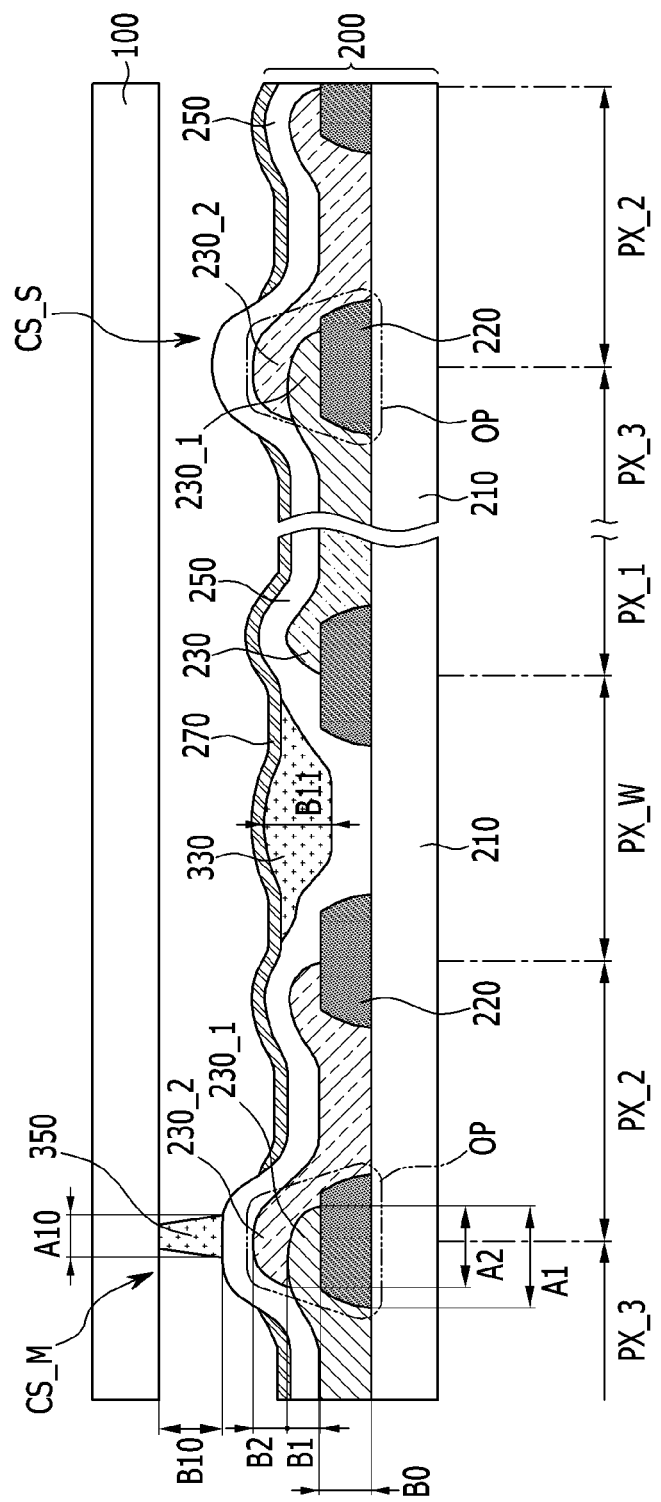
FIGS. 2, 3, 4, 5, 6, 7 are cross-sectional views illustrating the liquid crystal display panel illustrated in FIG. 1B taken along line II-II, respectively.

Referring to FIGS. 1B and 2, the liquid crystal display panel according to the exemplary embodiment includes a plurality of pixels, and the plurality of pixels includes a plurality of color pixels PX_1, PX_2, and PX_3, and white pixels PX_W. The plurality of pixels may be arranged substantially in a matrix form, but is not limited thereto.

The color pixels PX_1, PX_2, and PX_3 representing different colors and the white pixel PX_W adjacent thereto form one dot together to display an image having various colors including gray, white, and black. Particularly, the white pixel PX_W is transparent without representing the colors to increase the luminance of the image represented by a dot to which the white pixel belongs.

Here, the pixel may mean a unit area in which an image corresponding to one input image signal is displayed, and include a transmitting area (referred to as an aperture area) in which light is actually transmitted or emitted and a light blocking area in which the light is blocked. In the light blocking area, an electric device such as a thin film transistor of the corresponding pixel or a light blocking member 220 may be positioned.

In the exemplary embodiment, only three kinds of color pixels PX_1, PX_2, and PX_3 are illustrated, but the number of color pixels PX_1, PX_2, and PX_3 representing different colors is not limited thereto. Further, it is illustrated that one dot includes only one white pixel PX_W, but the number of white pixels PX_W included in one dot is not limited thereto.

The opposed panel 200 according to the exemplary embodiment includes color filters 230, a white filter 330, and the light blocking member 220 which are positioned on a substrate 210, when viewed in a cross-sectional structure.

The substrate 210 may be made of an insulating material such as glass, plastic, or the like.

The light blocking member 220 may be positioned on the substrate 210. The light blocking member 220 positioned in the display area is called a black matrix, and has a plurality of openings defining transmitting areas of the pixels PX_1, PX_2, PX_3, and PX_W. The light blocking member 220 is positioned between the adjacent pixels PX_1, PX_2, PX_3, and PX_W to prevent light leakage. The light blocking member 220 may include a pigment for blocking light such as black carbon, and include a photosensitive organic material.

The plurality of color filters 230 is positioned on the substrate 210 and the light blocking member 220. The color filter 230 includes a pigment representing a color, and may include a binder, a photoinitiator, and an organic material such as a monomer. The color filters 230 may include a red filter, a green filter, and a blue filter which may represent three primary colors such as red, green, and blue, respectively. However, the colors represented by the color filters 230 are not limited thereto, and may represent other basic colors, for example, three primary colors such as magenta, cyan, and yellow.

The color filter 230 representing the corresponding color is positioned on one of the color pixels PX_1, PX_2, and PX_3. On a partial area of the substrate 210, the light blocking member 220, and at least two of the plurality of color filters 230 are stacked to overlap with each other to form an overlapping portion OP. The overlapping portion OP may be positioned at a place which overlaps with the light blocking member 220, the thin film transistor of the thin film transistor panel 100, and the signal lines such as the gate line and the data line, but is not limited thereto. FIG. 2 illustrates an example in which two color filters 230 having different colors are stacked to overlap with each other on the light blocking member 220. Unlike those illustrated in FIG. 2, the light blocking member 220 may not be positioned below the color filters 230 overlapping with each other.

For convenience, the color filter 230 positioned at the bottom among the color filters 230 forming the overlapping portion OP is called a first color filter 230_1, and a color filter at an n-th (n is a natural number of 2 or more) position thereon is called an n-th color filter 230_n.

The color filters 230 overlapping with each other to form the overlapping portion OP may be connected with or spaced apart from the color filters 230 of the adjacent color filters PX_1, PX_2, and PX_3 as illustrated in FIG. 2.

At the overlapping portion OP, a thickness B1 of the first color filter 230_1 positioned on the light blocking member 220 may be smaller than a thickness B0 of the color filter 230 positioned in the transmitting areas of the color pixels PX_1, PX_2, and PX_3. For example, the thickness B1 may be about 30% to about 70% of the thickness B0. The thickness B0 of the color filter 230 positioned in the transmitting areas of the color pixels PX_1, PX_2, and PX_3 may be about 1.5 µm to about 2.5 µm, but is not limited thereto.

At the overlapping portion OP, a thickness B2 of a second color filter 230_2 positioned on the first color filter 230_1 may be smaller than the thickness B0 of the color filter 230 positioned in the transmitting areas of the color pixels PX_1, PX_2, and PX_3 and the thickness B1 of the first color filter 230_1. For example, the thickness B2 may be smaller than the thickness B1 and may be about 20% to about 50% of the thickness B0. Furthermore, a thickness of the n-th color filter 230_n (e.g., the thickness B2 of the second color filter 230_2) may be smaller than a thickness of an n−1-th color filter 230_n−1 therebelow (e.g., the thickness B1 of the first color filter 230_1), and for example, may be about 30% to about 70% of the thickness of the n−1-th color filter 230_n−1.

The thickness of the color filters 230 forming the overlapping portion OP may be controlled according to an area of the overlapping region.

At the overlapping portion OP, an overlapping region of the n-th color filter 230_n may be smaller than or the same as an overlapping region of the n−1-th color filter 230_n−1 therebelow. Further, the overlapping region of the n-th color filter 230_n with the n−1-th color filter 230_n−1 may be positioned in the overlapping region of the n−1-th color filter 230_n−1 and a layer therebelow.

An overlapping width of the color filter 230 positioned at the top among the color filters 230 forming the overlapping portion OP may be, for example, 20 µm to about 50 µm. Here, the overlapping width means a width of a portion overlapping with the layer therebelow. In the exemplary embodiment illustrated in FIG. 2, an overlapping width A2 of the second color filter 230_2 overlapping with the first color filter 230_1 may be about 20 µm to about 50 µm, and an overlapping width A1 of the first color filter 230_1 overlapping with the light blocking member 220 may be larger than or the same as the overlapping width A2.

When the overlapping portion is formed by a design condition as described above, the overlapping portion may be stably formed.

An overcoat layer 250 is entirely formed on the color filter 230 and the substrate 210. The overcoat layer 250 includes a transparent organic material, and flatness on the substrate 210 may be controlled by properly controlling the viscosity. A height of the upper surface of the overcoat layer 250 in the transmitting area of the white pixel PX_W may be smaller than a height of the upper surface of the overcoat layer 250 in the transmitting areas of the color pixels PX_1, PX_2, and PX_3, and a difference in height may vary according to the viscosity of the overcoat layer 250.

A transparent filter 330 and a transparent spacing member 350 are positioned on the overcoat layer 250.

The transparent filter 330 is also referred to as a white filter. The transparent filter 330 uses a term of a filter for convenience, but means a filter in which a wavelength of light passing through the transparent filter 330 is not substantially changed and the color of the transmitted light may be almost maintained. That is, when white light is incident to the transparent filter 330, the white light is emitted as it is, and when green light is incident to the transparent filter 330, the green light may be emitted as it is. However, the wavelength of the transmitted light may be changed in a predetermined range according to a characteristic of the transparent filter 330. For example, in the case where the green light passes through the transparent filter 330, even though the green light is emitted, the green light in which a color coordinate is changed in a predetermined range may be emitted.

The transparent filter 330 includes a portion positioned in the transmitting area of the white pixel PX_W. The transparent filter 330 is positioned at a portion where the height of the upper surface of the overcoat layer 250 is small so as to compensate for a difference in height of the overcoat layer 250. Accordingly, the height of the upper surface of the overcoat layer 250 in the color pixels PX_1, PX_2, and PX_3 is substantially similar to the height of the upper surface of the transparent filter 330 in the white pixel PX_W, and as a result, the overcoat layer 250 may be entirely flattened. As a result, a cell gap of the white pixel PX_W may be similar to or substantially the same as cell gaps of the color pixels PX_1, PX_2, and PX_3. Then, when the liquid crystal display panel is viewed from the side, it is possible to prevent a color coordinate from being distorted. Particularly, in the exemplary embodiment, the overall flatness is easily controlled by properly controlling at least one of the viscosity of the overcoat layer 250 and the thickness of the transparent filter 330.

As illustrated in FIG. 2, the transparent spacing member 350 may be positioned on at least one of the plurality of overlapping portions OP formed so that the light blocking member 220 and at least two of the plurality of color filters 230 are stacked to overlap with each other, and may be positioned at a place except for the transmitting area of the pixel of the place except for the overlapping portion OP. Particularly, as illustrated in FIG. 2, in the case where the transparent spacing member 350 is positioned at a place overlapping with the overlapping portion OP, the overlapping portion OP, the transparent spacing member 350, and the overcoat layer 250 therebetween has an upper surface higher than the periphery and protrudes to form a main spacer CS_M. The main spacer CS_M may serve to maintain the cell gap of the liquid crystal layer 3, that is, a space between the opposed panel 200 and the thin film transistor panel 100.

The upper surface of the overlapping portion OP where the transparent spacing member 350 is not positioned is lower than the upper surface of the main spacer CS_M, but higher than the periphery and protrudes to form a sub spacer CS_S. The sub spacer CS_S may serve to maintain the cell gap of the liquid crystal layer 3 even in the case where the opposed panel 200 or the thin film transistor panel 100 is bent inwards by external pressure.

A width A10 of the transparent spacing member 350 may be smaller than or the same as the overlapping width A2 of the second color filter 230_2 positioned at the top of the overlapping portion OP. Further, the overlapping region of the transparent spacing member 350 with the second color filter 230_2 may be positioned in the overlapping region of the second color filter 230_2 and the first color filter 230_1 therebelow.

The transparent spacing member 350 and the transparent filter 330 may be formed with the same material in the same process. The transparent spacing member 350 and the transparent filter 330 may include a transparent organic material, and for example, may include an acryl-based resin and the like.

A thickness B10 of the transparent spacing member 350 may be the same as or different from a thickness B11 of the transparent filter 330. In the exemplary embodiment, since the transparent spacing member 350 is positioned at a place higher than the transparent filter 330, an example in which the thickness B10 of the transparent spacing member 350 is smaller than the thickness B11 of the transparent filter 330 is illustrated, but is not limited thereto, and the thickness B11 of the transparent filter 330 may be smaller than the thickness B10 of the transparent spacing member 350. According to another exemplary embodiment, the thickness B10 of the transparent spacing member 350 and the thickness B11 of the transparent filter 330 may be formed so as to be different from each other by using a photomask including a halftone.

An opposed electrode 270 is positioned on the overcoat layer 250 and the transparent filter 330. The opposed electrode 270 may include a transparent conductive material such as ITO and IZO, and transfer a common voltage. The opposed electrode 270 may be patterned, and the opposed electrode 270 is not positioned on the transparent spacing member 350 and the overlapping portion OP.

When a manufacturing method of the opposed panel 200 will be described, first, a material for the light blocking member is deposited on the substrate 210, and the light blocking member 220 having a plurality of openings is formed by a photolithography process of exposing and developing the material.

Next, a plurality of color filters 230 is formed on the light blocking member 220. Particularly, as illustrated in FIG. 2, an overlapping portion OP where the light blocking member 220 and at least two of the plurality of color filters 230 overlap with each other is formed. In this case, the patterning of the color filter 230 may use a photographic process.

Next, an organic material is deposited on the entire surface of the substrate 210 to form the overcoat layer 250.

Next, a transparent organic material is deposited and patterned on the overcoat layer 250 to form the transparent spacing member 350 and the transparent filter 330 together. In this case, the patterning of the transparent spacing member 350 and the transparent filter 330 may use a photolithography process using one photomask.

Next, a transparent conductive material is deposited and patterned on the overcoat layer 250 and the transparent filter 330 to form the opposed electrode 270.

As such, according to the exemplary embodiment, since the transparent spacing member 350 forming the main spacer CS_M and the transparent filter 330 of the white pixel PX_W are simultaneously formed by one photolithography process, the process may be simplified without adding the photomask and the photolithography process, and a processing time and processing cost may be reduced. As described above, the transparent filter 330 is formed so that the cell gap of the white pixel PX_W is the same as the cell gaps of the color pixels PX_1, PX_2, and PX_3 to prevent a change in color coordinate at the side and increase display quality.

Furthermore, according to the exemplary embodiment, since the light blocking member 220 and at least two of the plurality of color filters 230 overlap with each other to form a plurality of overlapping portions OP and the transparent spacing member 350 is formed at a part of the overlapping portions OP, both the main spacer CS_M and the sub spacer CS_S having different heights may be easily formed without an additional process, and the cell gap of the liquid crystal display panel may be stably maintained even by various external pressures.

Further, according to the exemplary embodiment, the main spacer CS_M and the sub spacer CS_S may be stably formed.

The opposed panel 200 manufactured as described above is attached to the thin film transistor panel 100 separately manufactured, and a liquid crystal material is injected between the two substrates 110 and 210 to complete the liquid crystal display panel. The thin film transistor panel 100 includes the substrate 110 as described below.

Figure 3:
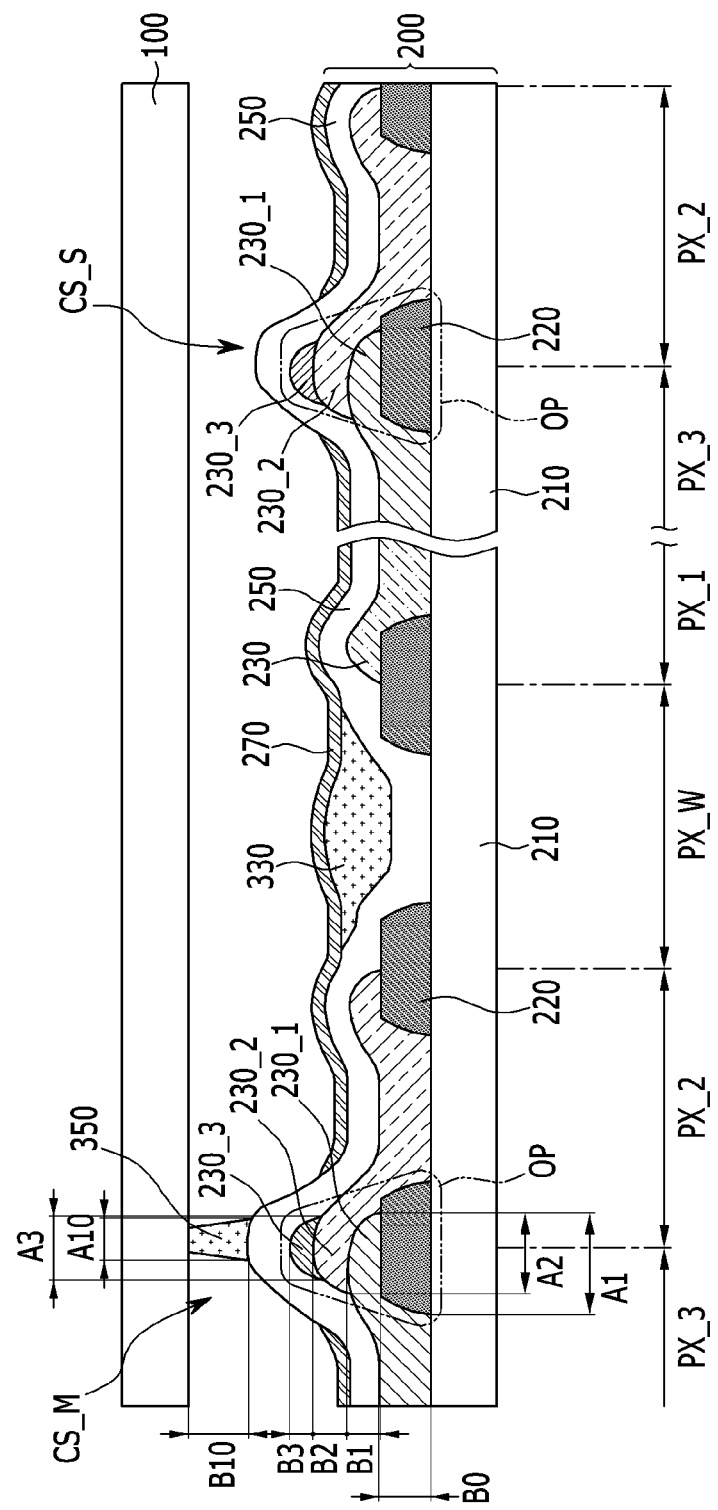

Next, FIG. 3 illustrates an example in which the opposed panel 200 according to the exemplary embodiment is almost the same as that of the exemplary embodiment illustrated in FIGS. 1B and 2, but three color filters 230 having different colors overlap with each other to form the overlapping portion OP on the light blocking member 220. That is, the overlapping portion OP may include the light blocking member 220, the first color filter 230_1 thereon, the second color filter 230_2 thereon, and the third color filter 230_3 thereon.

At the overlapping portion OP, a thickness B1 of the first color filter 230_1 positioned on the light blocking member 220 may be smaller than a thickness B0 of the color filter 230 positioned in the transmitting areas of the color pixels PX_1, PX_2, and PX_3, and for example, the thickness B1 may be about 30% to about 70% of the thickness B0. At the overlapping portion OP, a thickness B2 of the second color filter 230_2 may be smaller than the thickness B1 of the first color filter 230_1, and for example, may be about 20% to about 50% of the thickness B0. Further, a thickness B3 of the third color filter 230_3 may be smaller than the thickness B2 of the second color filter 230_2, and for example, may be about 10% to about 40% of the thickness B0.

An overlapping width A3 of the third color filter 230_3 positioned at the top of the color filters 230 forming the overlapping portion OP may be, for example, about 20 μm to about 50 μm, the overlapping width A2 of the second color filter 230_2 therebelow may be larger than the overlapping width A3, and the overlapping width A1 of the first color filter 230_1 may be larger than the overlapping width A2.

In the exemplary embodiment, the width A10 of the transparent spacing member 350 positioned on the overlapping portion OP is smaller than or the same as the overlapping width A3 of the third color filter 230_3 positioned on the top of the overlapping portion OP to be stably stacked.

Besides, various features and effects of the exemplary embodiment of FIGS. 1B and 2 may be equally applied even to the exemplary embodiment, and the duplicated description will be omitted.

Figure 4:
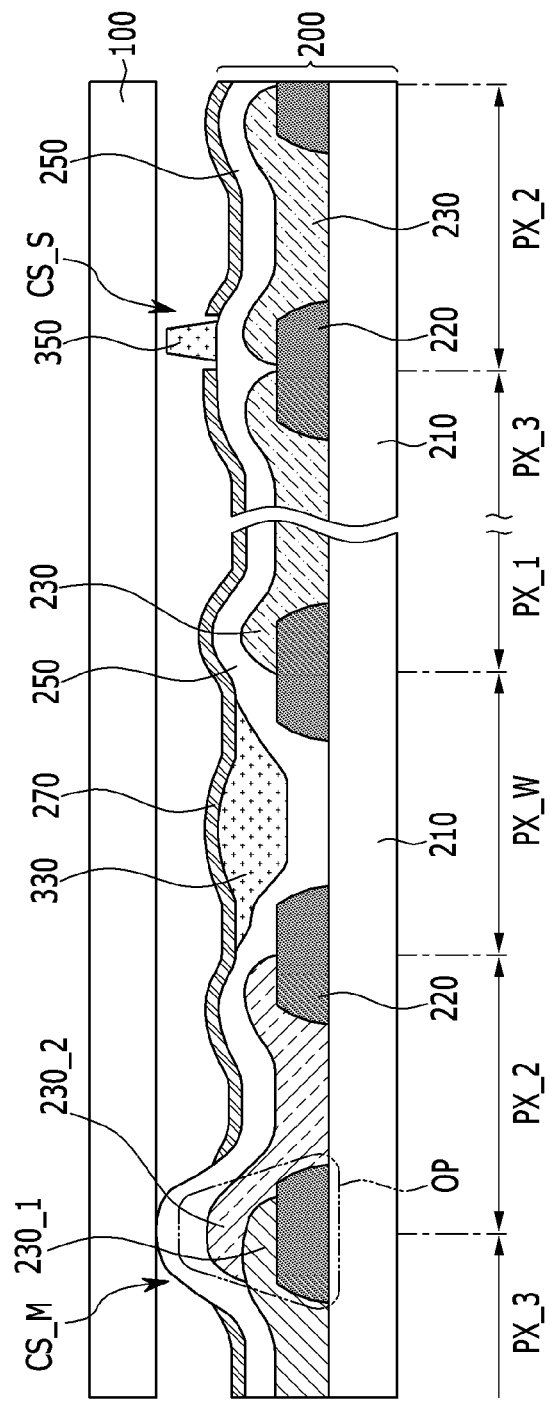

Referring now to FIG. 4, the opposed panel 200 according to the exemplary embodiment is almost the same as that of the exemplary embodiment illustrated in FIGS. 1B and 2, but the transparent spacing member 350 may be positioned at the overlapping portion OP and another place except for the transmitting area of the pixel which is not positioned on the overlapping portion OP, for example, a place overlapping with the light blocking member 220 or the thin film transistor.

In this case, heights of the upper surface of the overlapping portion OP where the light blocking member 220 and at least two of the plurality of color filters 230 overlap with each other and the upper surface of the transparent spacing member 350 may be different from each other or substantially the same as each other. As illustrated in FIG. 4, when the upper surface of the overlapping portion OP is higher than the upper surface of the transparent spacing member 350, the overlapping portion OP forms the main spacer CS_M together with the overcoat layer 250 thereon and the like, and the transparent spacing member 350 may form the sub spacer CS_S. Unlike this, when the upper surface of the overlapping portion OP and the upper surface of the transparent spacing member 350 are substantially the same as each other, the overlapping portion OP and the transparent spacing member 350 may serve as the same spacer CS.

Besides, various features and effects of the exemplary embodiment of FIGS. 1B and 2 may be equally applied even to the exemplary embodiment, and the duplicated description will be omitted.

Figure 5:
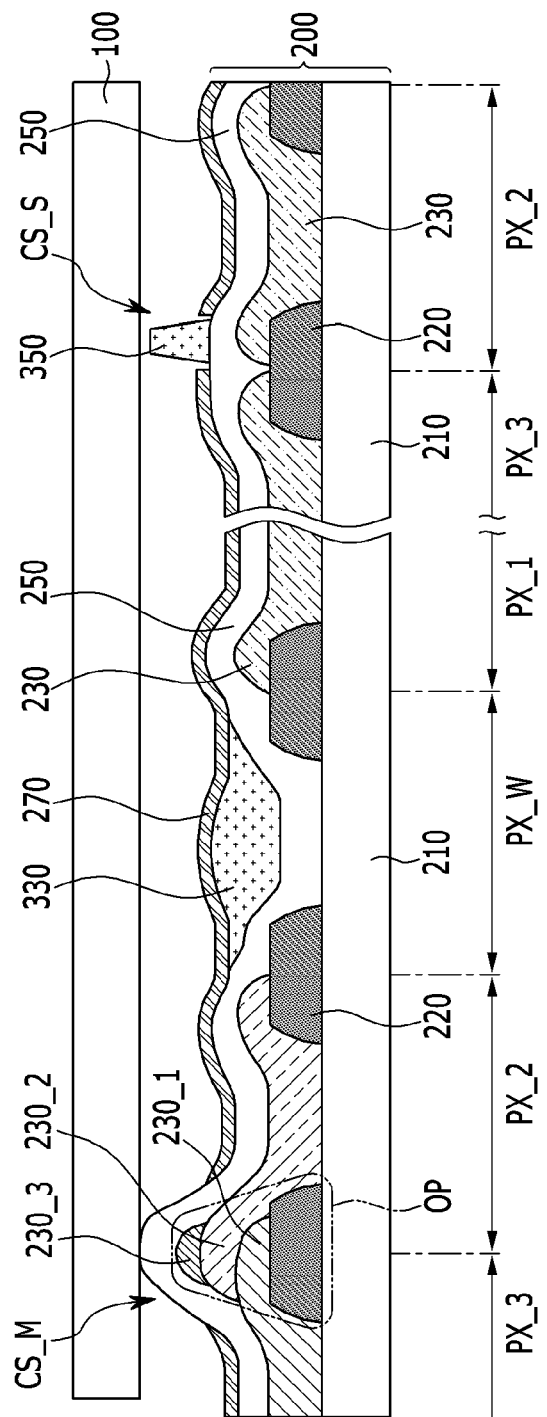

Next, FIG. 5 illustrates an example in which the opposed panel according to the exemplary embodiment is almost the same as that of the exemplary embodiment illustrated in FIG. 4, but three color filters 230 having different colors overlap with each other to form the overlapping portion OP on the light blocking member 220. That is, the overlapping portion OP may include the light blocking member 220, the first color filter 230_1 thereon, the second color filter 230_2 thereon, and the third color filter 230_3 thereon.

Besides, various features and effects of the exemplary embodiment of FIG. 4 and the exemplary embodiment of FIG. 3 may be equally applied even to the exemplary embodiment, and the duplicated description will be omitted.

Next, FIG. 6 illustrates an example in which the opposed panel according to the exemplary embodiment is almost the same as that of the exemplary embodiment illustrated in FIG. 4, but the upper surface of the overlapping portion OP is lower than the upper surface of the transparent spacing member 350. In this case, the overlapping portion OP forms the sub spacer CS_S together with the overcoat layer 250 thereon and the like, and the transparent spacing member 350 may form the main spacer CS_M. Unlike this, when the upper surface of the overlapping portion OP and the upper surface of the transparent spacing member 350 are substantially the same as each other, the overlapping portion OP and the transparent spacing member 350 may serve as the same spacer CS.

Next, FIG. 7 illustrates an example in which the opposed panel according to the exemplary embodiment is almost the same as that of the exemplary embodiment illustrated in FIG. 6, but three color filters 230 having different colors overlap with each other to form the overlapping portion OP on the light blocking member 220. That is, the overlapping portion OP may include the light blocking member 220, the first color filter 230_1 thereon, the second color filter 230_2 thereon, and the third color filter 230_3 thereon.

Besides, various features and effects of the exemplary embodiment of FIG. 6 and the exemplary embodiment of FIG. 3 may be equally applied even to the exemplary embodiment, and the duplicated description will be omitted.

Next, referring to FIGS. 8A and 8B, the opposed panel according to the exemplary embodiment is almost the same as that of the exemplary embodiment illustrated in FIGS. 1B and 2, but the transparent filter 330 and the transparent spacing member 350 are not formed. That is, in the white pixel PX_W, a separate transparent filter is not formed and a separate spacer for maintaining the cell gap is not formed. Accordingly, the photolithography process for forming the transparent filter and the transparent spacing member may be omitted, and as a result, the manufacturing process is more simplified. Instead, the upper surface of the overlapping portion OP formed when the light blocking member 220 and at least two of the plurality of color filters 230 overlap with each other is formed to be higher than the periphery, and as a result, the overlapping portion OP and the overcoat layer 250 thereon serve as a spacer CS maintaining the cell gap together.

The transmitting area of the white pixel PX_W may be almost filled by the overcoat layer 250. Accordingly, the thickness of the overcoat layer 250 positioned in the transmitting area of the white pixel PX_W may be substantially the same as or larger than the thickness of the color filter 230 positioned in the transmitting area of the color pixels PX_1, PX_2, and PX_3. Further, the thickness of the overcoat layer 250 positioned in the transmitting area of the white pixel PX_W may be larger than the overcoat layer 250 positioned on the color filters 230 of the color pixels PX_1, PX_2, and PX_3. Accordingly, in the white pixel PX_W, the height of the upper surface of the overcoat layer 250 may be the same as or higher than the height of the upper surface of the color filter 230 positioned in the transmitting area of the color pixels PX_1, PX_2, and PX_3.

Since the upper surface of the overcoat layer 250 in the white pixel PX_W sags below the upper surface of the overcoat layer 250 in the color pixels PX_1, PX_2, and PX_3, the overcoat layer 250 may include a high flattened organic material having sufficient viscosity so as to prevent the cell gap of the white pixel PX_W from being different from the cell gap of the color pixels PX_1, PX_2, and PX_3.

Next, FIG. 9 illustrates an example in which the opposed panel according to the exemplary embodiment is almost the same as that of the exemplary embodiment illustrated in FIGS. 8A and 8B, but three color filters 230 having different colors overlap with each other to form the overlapping portion OP on the light blocking member 220. That is, the overlapping portion OP may include the light blocking member 220, the first color filter 230_1 thereon, the second color filter 230_2 thereon, and the third color filter 230_3 thereon.

Besides, various features and effects of the exemplary embodiment of FIGS. 8A and 8B and the exemplary embodiment of FIG. 3 may be equally applied even to the exemplary embodiment, and the duplicated description will be omitted.

Next, a detailed structure of the opposed panel 100 included in the liquid crystal display panel according to the exemplary embodiment will be described with reference to FIGS. 10A, 10B, and 11 to 37 in addition to FIG. 1A.

Figure 10A:
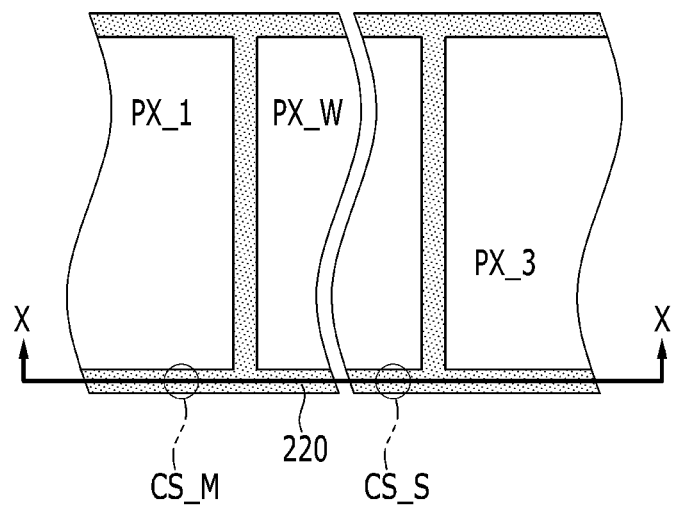
FIG. 10A is a layout view of a liquid crystal display panel according to yet another exemplary embodiment.
Figure 33:
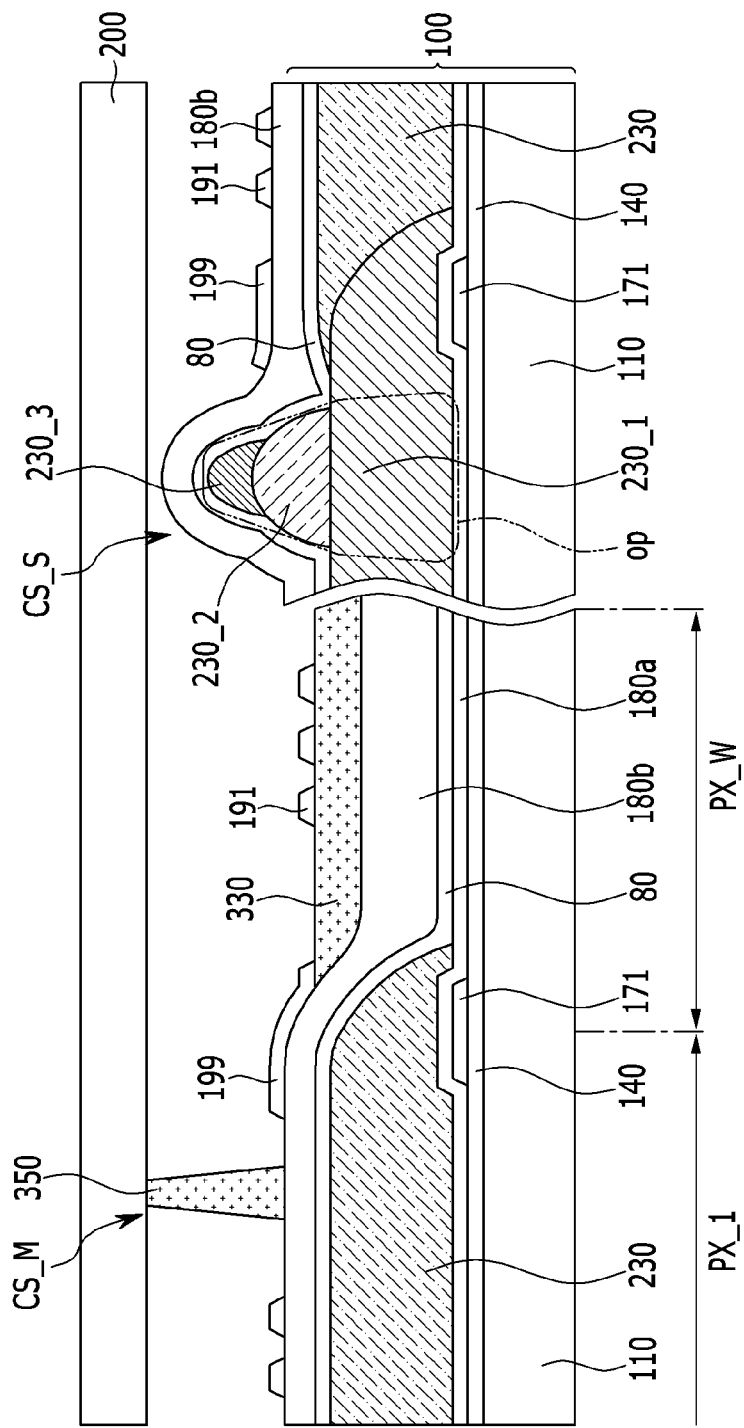
Figure 34A:
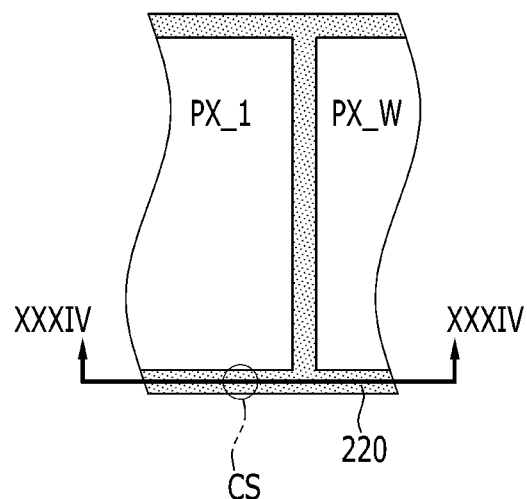
FIG. 34A is a layout view of a liquid crystal display panel according to still another exemplary embodiment.

FIG. 10A is a layout view of a liquid crystal display panel according to yet another exemplary embodiment, FIGS. 10B and 11 to 33 are cross-sectional views illustrating the liquid crystal display panel illustrated in FIG. 10A taken along line X-X, respectively, FIG. 34A is a layout view of a liquid crystal display panel according to still another exemplary embodiment, and FIGS. 34B and 35 to 37 are cross-sectional views illustrating the liquid crystal display panel illustrated in FIG. 34A taken along line XXXIV-XXXIV, respectively.

Figure 10B:
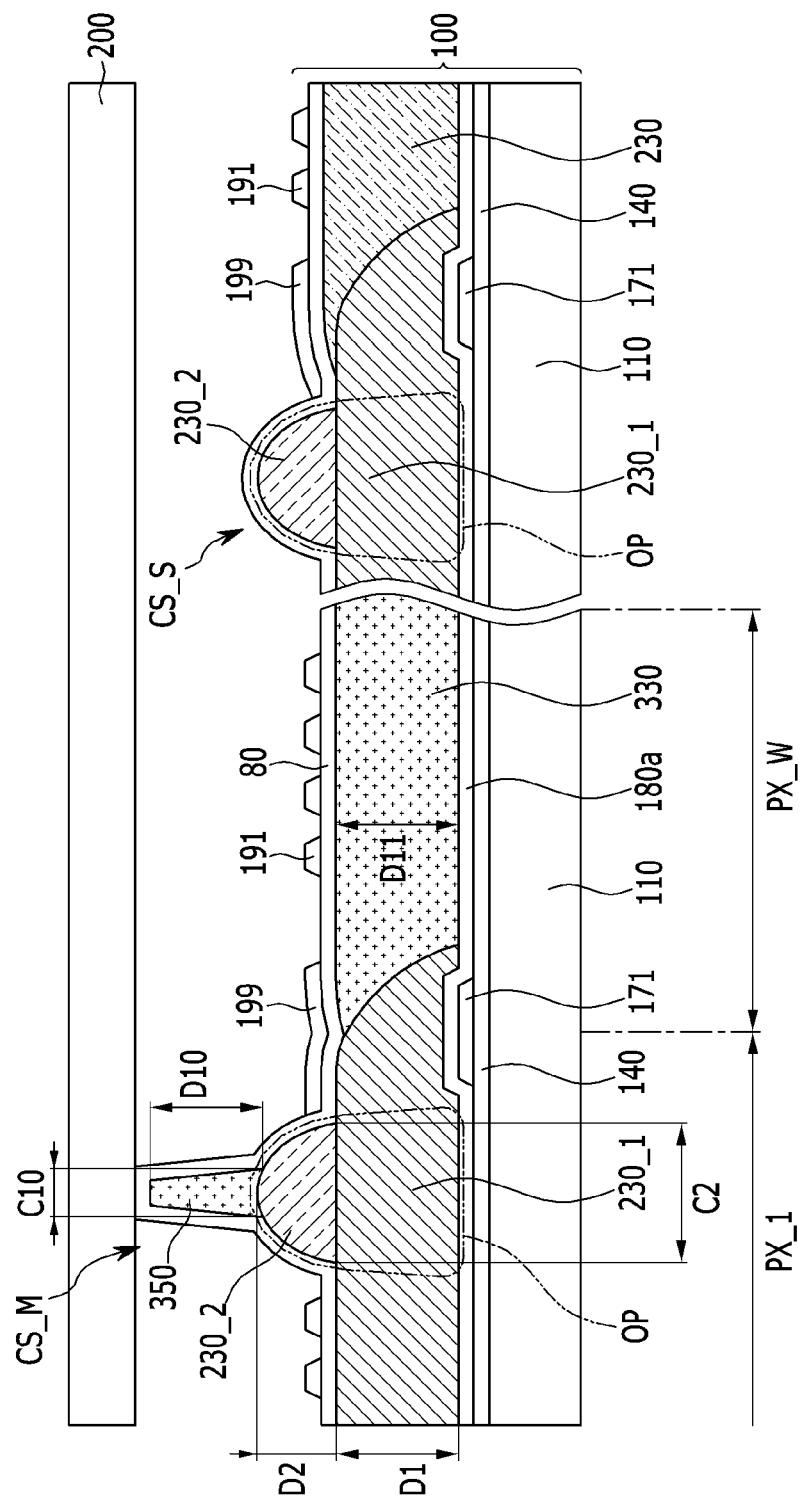
FIGS. 10B and 11, 12, 13, 14, 15, 16, 17, 18, 19, 20, 21, 22, 23, 24, 25, 26, 27, 28, 29, 30, 31, 32, 33 are cross-sectional views illustrating the liquid crystal display panel illustrated in FIG. 10A taken along line X-X, respectively.

Referring to FIGS. 10A and 10B, the thin film transistor panel 100 according to the exemplary embodiment includes a plurality of thin film transistors positioned on a substrate 110, a pixel electrode 191 connected thereto, and the like.

The substrate 110 may be made of an insulating material such as glass, plastic, or the like.

A gate conductor (not illustrated) including a gate line is positioned on the substrate 110, and a gate insulating layer 140 is positioned thereon. The gate insulating layer 140 may include an organic insulating material such as silicon nitride and silicon oxide.

A semiconductor layer (not illustrated) and a data conductor are positioned on the gate insulating layer 140. The data conductor includes a plurality of data lines 171 transferring data voltages. The data line 171 may be almost extended between the adjacent pixels, but is not limited thereto. FIG. 10B illustrates an example in which the data line 171 is positioned between the adjacent pixels. In the case where the data line 171 includes a portion extended between the adjacent pixels, the data line 171 may be covered by the light blocking member positioned on the thin film transistor panel 100 or the opposed panel 200.

The thin film transistor is connected with the gate line and the data line 171.

A first passivation layer 180a is positioned on the thin film transistor including the data conductor. The first passivation layer 180a may include an inorganic insulating material or an organic insulating material.

A plurality of color filters 230 is positioned on the first passivation layer 180a. A color filter 230 representing the corresponding color is positioned one of the color pixels PX_1, PX_2, and PX_3. On a partial area of the substrate 110, at least two of the plurality of color filters 230 are stacked to overlap with each other to form an overlapping portion OP. FIG. 10B illustrates an example in which two color filters 230 of a first color filter 230_1 and a second color filter 230_2 overlap with each other to form the overlapping portion OP. The overlapping portion OP may be positioned at a place overlapping with the thin film transistor, the gate line, the data line 171, the light blocking member of the opposed panel 200, and the like, but is not limited thereto.

The light blocking member may be positioned on the opposed panel 200 or the thin film transistor panel 100, and when the light blocking member is positioned on the thin film transistor panel 100, the overlapping portion OP may overlap with the light blocking member.

The overlapping portion OP may overlap with the data line 171 or be adjacent to the data line 171.

The second color filter 230_2 or a color filter positioned thereon of the color filters forming the overlapping portion OP may be connected with the color filter of the adjacent color pixels PX_1, PX_2, and PX_3, or may be spaced apart from the color filter of the adjacent color pixels PX_1, PX_2, and PX_3 as illustrated in FIG. 10B. The first color filter 230_1 may include a portion positioned in the transmitting area of the color pixels PX_1, PX_2, and PX_3.

At the overlapping portion OP, a thickness D2 of the second color filter 230_2 may be smaller than a thickness D1 of the first color filter 230_1 positioned therebelow. For example, the thickness D2 may be about 30% to about 70% of the thickness D1. Furthermore, a thickness of the n-th color filter 230_n configuring the overlapping portion OP may be smaller than a thickness of an n-1-th color filter 230_n-1 therebelow, and for example, may be about 30% to about 70% of the thickness of the n-1-th color filter 230_n-1. The thickness of the color filter positioned at the bottom may be about 2.5 μm to about 4.0 μm, but is not limited thereto.

Similarly to the exemplary embodiment described above, at the overlapping portion OP, an overlapping area of the n-th color filter 230_n may be smaller than or the same as an overlapping area of the n-1-th color filter 230_n-1 therebelow. Further, the overlapping area of the n-th color filter 230_n with the n-1-th color filter 230_n-1 may be positioned in the overlapping area of the n-1-th color filter 230_n-1 and a layer therebelow. The layer below the n-1-th color filter 203_n-1 may be another color filter or the first passivation layer 180a.

An overlapping width of the color filter 230 positioned at the top among the color filters 230 forming the overlapping portion OP may be, for example, about 20 μm to about 50 μm. In the exemplary embodiment illustrated in FIG. 10B, an overlapping width C2 of the second color filter 230_2 may be about 20 μm to about 50 μm.

A transparent filter 330 and a transparent spacing member 350 may be positioned on the color filter 230 and the first passivation layer 180a.

The transparent filter 330 includes a portion which is positioned in the transmitting area of the white pixel PX_W, and the upper surface thereof may have substantially the same height as the upper surface of the color filter 230 of the color pixels PX_1, PX_2, and PX_3. Accordingly, the upper surface of the substrate 110 may be substantially flattened, and the cell gap of the white pixel PX_W may be formed substantially the same as the cell gap of the color pixels PX_1, PX_2, and PX_3. As a result, when the liquid crystal display panel is viewed from the side, it is possible to prevent a color coordinate from being distorted.

As illustrated in FIG. 10B, the transparent spacing member 350 may be positioned on at least one of the plurality of overlapping portions OP formed so that at least two of the plurality of color filters 230 are stacked to overlap with each other, and may be positioned at a place except for the transmitting area of the pixel of the place except for the overlapping portion OP. Particularly, as illustrated in FIG. 10B, in the case where the transparent spacing member 350 is positioned at a place overlapping with the overlapping portion OP, the overlapping portion OP and the transparent spacing member 350 protrude with an upper surface higher than the periphery to form a main spacer CS_M.

The upper surface of the overlapping portion OP where the transparent spacing member 350 is not positioned is lower than the upper surface of the main spacer CS_M, but protrudes to be higher than the periphery to form a sub spacer CS_S.

A width C10 of the transparent spacing member 350 may be smaller than or the same as the overlapping width C2 of the second color filter 230_2 positioned at the top of the overlapping portion OP. Further, the overlapping region of the transparent spacing member 350 with the second color filter 230_2 may be positioned in the overlapping region of the second color filter 230_2 and the first color filter 230_1 therebelow.

The transparent spacing member 350 and the transparent filter 330 may be formed with the same material in the same process. The transparent spacing member 350 and the transparent filter 330 may include a transparent organic material, and for example, may include an acryl-based resin and the like.

A thickness D10 of the transparent spacing member 350 may be the same as or different from a thickness D11 of the transparent filter 330. In the exemplary embodiment, since the transparent spacing member 350 is positioned at a place higher than the transparent filter 330, the thickness D10 of the transparent spacing member 350 may be smaller than the thickness D11 of the transparent filter 330. According to another exemplary embodiment, the thickness D10 of the transparent spacing member 350 and the thickness D11 of the transparent filter 330 may be different from each other by using a photomask including a halftone.

A capping layer 80 may be positioned on the second color filter 230_2, the transparent spacing member 350, and the transparent filter 330. The capping layer 80 prevents the color filter 230 and the transparent filter 330 therebelow from being lifted and suppresses the contamination of the liquid crystal layer 3 due to an organic material such as a solvent flowing into from the color filter 230, thereby preventing defects such as an afterimage which may be caused when the liquid crystal display panel is driven.

A plurality of pixel electrodes 191 and shielding electrodes 199 are positioned on the capping layer 80. The pixel electrode 191 and the shielding electrode 199 may include a transparent conductive material such as ITO or IZO.

The pixel electrode 191 is patterned to have a shape including a plurality of branch electrodes (not illustrated), but is not limited thereto. The pixel electrode 191 is connected with the thin film transistor through contact holes (not illustrated) formed in at least a part of the capping layer 80, the first passivation layer 180a, and the gate insulating layer 140 to receive a data voltage.

The shielding electrode 199 may include a portion covering the data line 171. The shielding electrode 199 shields an electric field from the data line 171 to prevent light leakage between the adjacent pixels. Accordingly, a separate light blocking member overlapping with the data line 171 need not be formed to increase an aperture ratio and transmittance of the pixels.

When a manufacturing method of the thin film transistor panel 100 will be described, first, metal and the like are deposited and patterned on the substrate 110 to form a gate conductor including a gate line.

Next, the gate insulating layer 140 is deposited on the gate conductor, a semiconductor layer is deposited thereon, and metal and the like are deposited and patterned thereon to form a data conductor including a data line 171. The gate conductor, the semiconductor layer, and the data conductor may form a plurality of thin film transistors together.

Next, an insulating material is deposited on the thin film transistor to form the passivation layer 180a, and a plurality of color filters 230 is formed thereon. Particularly, as illustrated in FIG. 10B, an overlapping portion OP where at least two of the plurality of color filters 230 overlap with each other is formed. In this case, the patterning of the color filters 230 may use a photolithography process.

Next, a transparent organic material is deposited and patterned on the color filter and the first passivation layer 180a to form the transparent filter 330 and the transparent spacing member 350. In this case, the patterning may use a photolithography process using one photomask.

Next, the capping layer 80 is deposited on the entire surface of the substrate 110, and then the capping layer 80, the first passivation layer 180a, and the gate insulating layer 140 are patterned by a photolithography process and the like to form contact holes.

Next, a transparent conductive material such as ITO and IZO is deposited and patterned on the capping layer 80 to form a plurality of pixel electrodes 191 and shielding electrodes 199.

As such, according to the exemplary embodiment, since the transparent spacing member 350 forming the main spacer CS_M and the transparent filter 330 of the white pixel PX_W are simultaneously formed by one photolithography process, the process may be simplified without adding the photomask and the photolithography process, and a processing time and processing cost may be reduced. As described above, the transparent filter 330 is formed so that the cell gap of the white pixel PX_W is the same as the cell gaps of the color pixels PX_1, PX_2, and PX_3 to prevent a change in color coordinate at the side and increase display quality.

Furthermore, according to the exemplary embodiment, since at least two of the plurality of color filters 230 overlap with each other to form a plurality of overlapping portions OP and the transparent spacing member 350 is formed at a part of the overlapping portions OP, both the main spacer CS_M and the sub spacer CS_S having different heights may be easily formed without an additional process, and the cell gap of the liquid crystal display panel may be stably maintained even due to various external pressures.

The thin film transistor panel 100 manufactured as described above is attached to the opposed panel 200 separately manufactured, and a liquid crystal material is injected between the two substrates 110 and 210 to complete the liquid crystal display panel.

Figure 11:
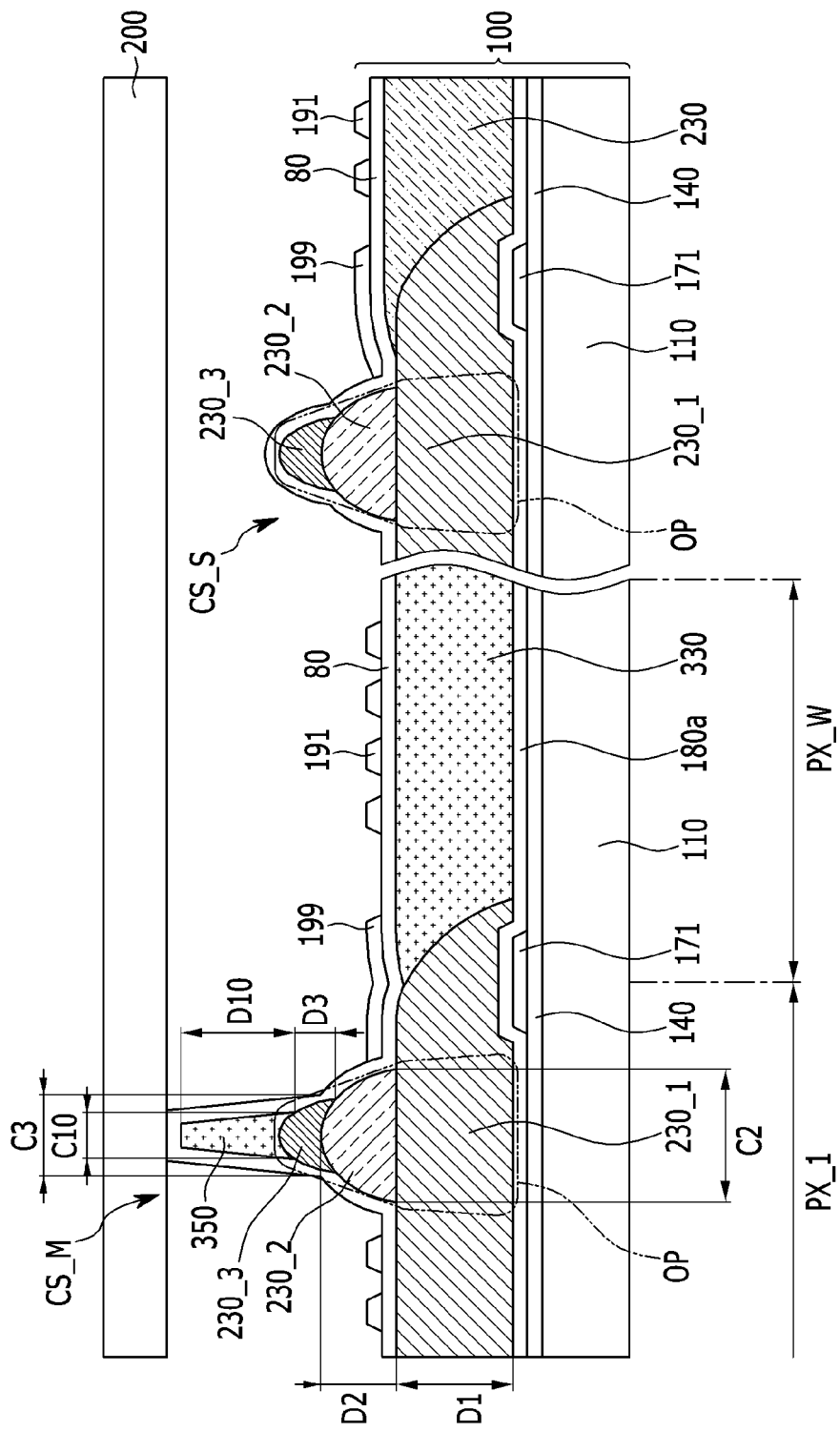

Next, FIG. 11 illustrates an example in which the thin film transistor panel 100 according to the exemplary embodiment is almost the same as that of the exemplary embodiment illustrated in FIGS. 10A and 10B, but three color filters 230 having different colors overlap with each other to form an overlapping portion OP. That is, the overlapping portion OP may include a first color filter 230_1, a second color filter 230_2 thereon, and a third color filter 230_3 thereon.

At the overlapping portion OP, a thickness D2 of the second color filter 230_2 may be smaller than a thickness D1 of the first color filter 230_1 therebelow or the first color filter 230_1 positioned in the transmitting area of the color pixels PX_1, PX_2, and PX_3, and for example, the thickness D2 may be about 30% to about 70% of the thickness D1. At the overlapping portion OP, a thickness D3 of the third color filter 230_3 may be smaller than the thickness D2 of the second color filter 230_2, and for example, may be about 20% to about 50% of the thickness D1 of the first color filter 230_1.

An overlapping width C3 of the third color filter 230_3 positioned at the top of the color filters 230 forming the overlapping portion OP may be, for example, about 20 μm to about 50 μm, and an overlapping width C2 of the second color filter 230_2 therebelow is larger than the overlapping width C3.

In the exemplary embodiment, a width C10 of the transparent spacing member 350 positioned on the overlapping portion OP is smaller than or the same as the overlapping width C3 of the third color filter 230_3 positioned on the top of the overlapping portion OP to be stably stacked.

Besides, various features and effects of the exemplary embodiment of FIGS. 10A and 10B may be equally applied even to the exemplary embodiment, and the duplicated description will be omitted.

Figure 12:
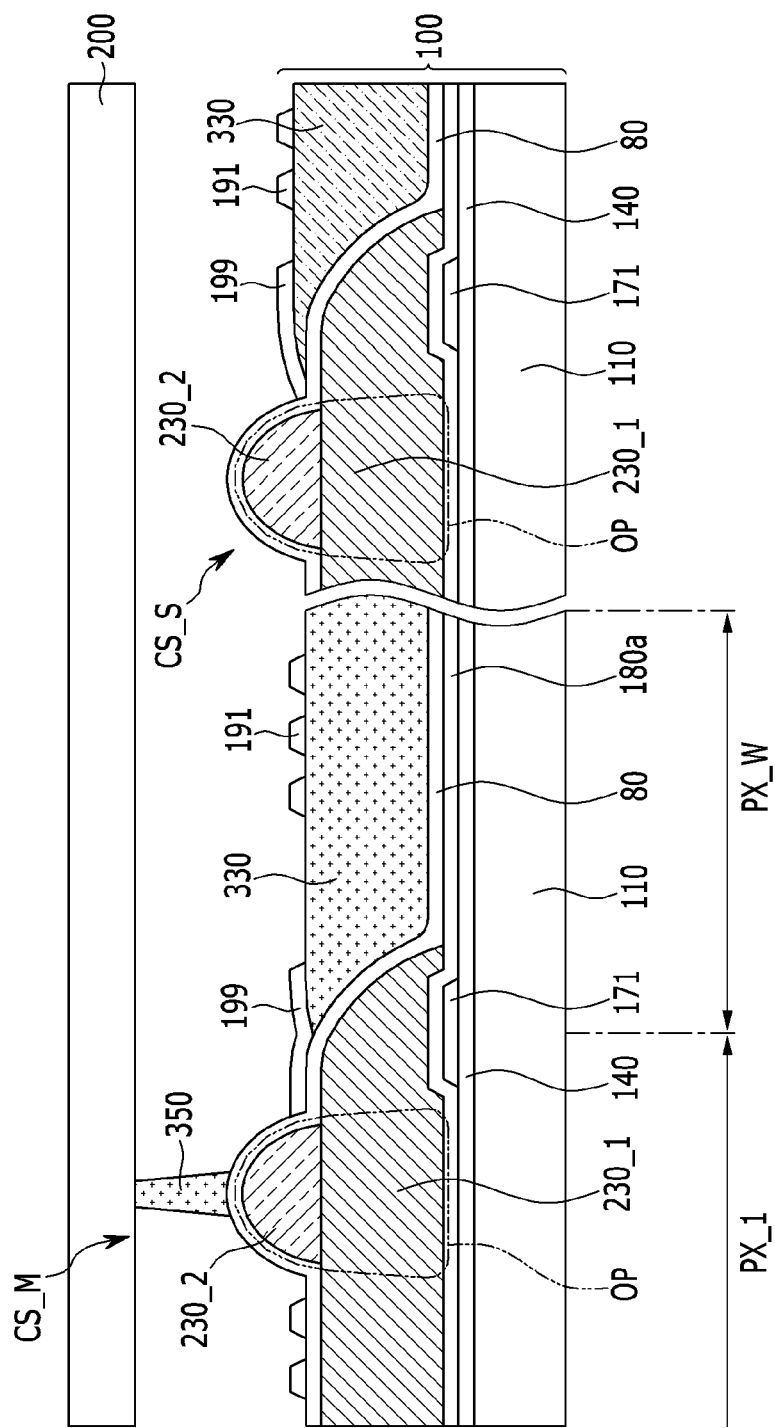

Next, referring to FIG. 12, the thin film transistor panel 100 according to the exemplary embodiment is almost the same as that of the exemplary embodiment illustrated in FIGS. 10A and 10B, but positions of the capping layers 80 may be different from each other. For example, as illustrated in FIG. 12, the capping layer 80 is positioned below the transparent filter 330 and the transparent spacing member 350, and may be positioned on the second color filter 230_2 of the overlapping portion OP and the first passivation layer 180a. The capping layer 80 prevents the color filter 230 therebelow from being lifted and suppresses the contamination of the liquid crystal layer 3 due to an organic material such as a solvent flowing into from the color filter 230, thereby preventing defects such as an afterimage which may be caused when the liquid crystal display panel is driven.

As a result, the plurality of pixel electrodes 191 and shielding electrodes 199 may be positioned on the transparent filter 330.

Figure 13:
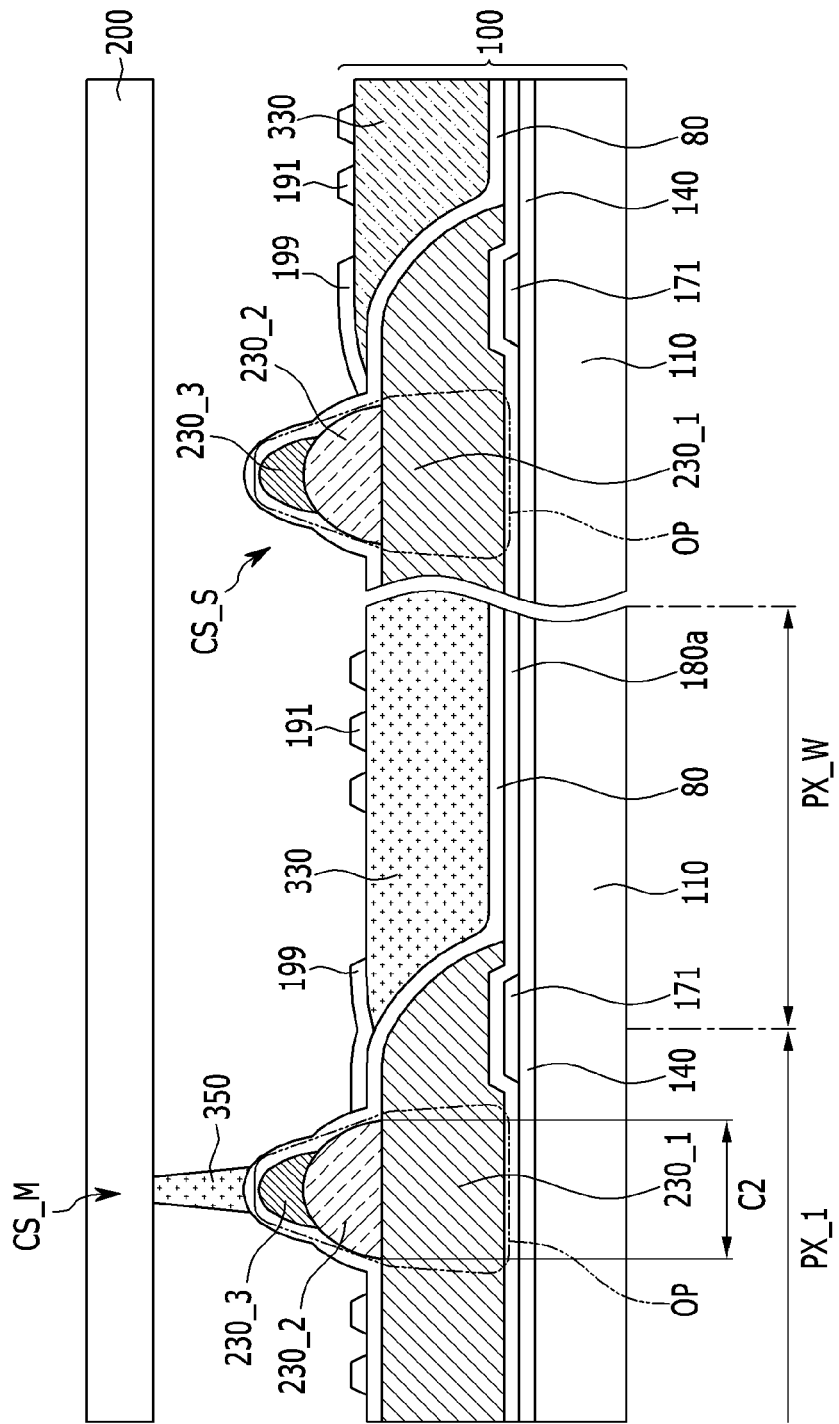

Next, FIG. 13 illustrates an example in which the thin film transistor panel 100 according to the exemplary embodiment is almost the same as that of the exemplary embodiment illustrated in FIG. 12, but three color filters 230 having different colors overlap with each other to form an overlapping portion OP. That is, the overlapping portion OP may include a first color filter 230_1, a second color filter 230_2 thereon, and a third color filter 230_3 thereon.

Figure 14:
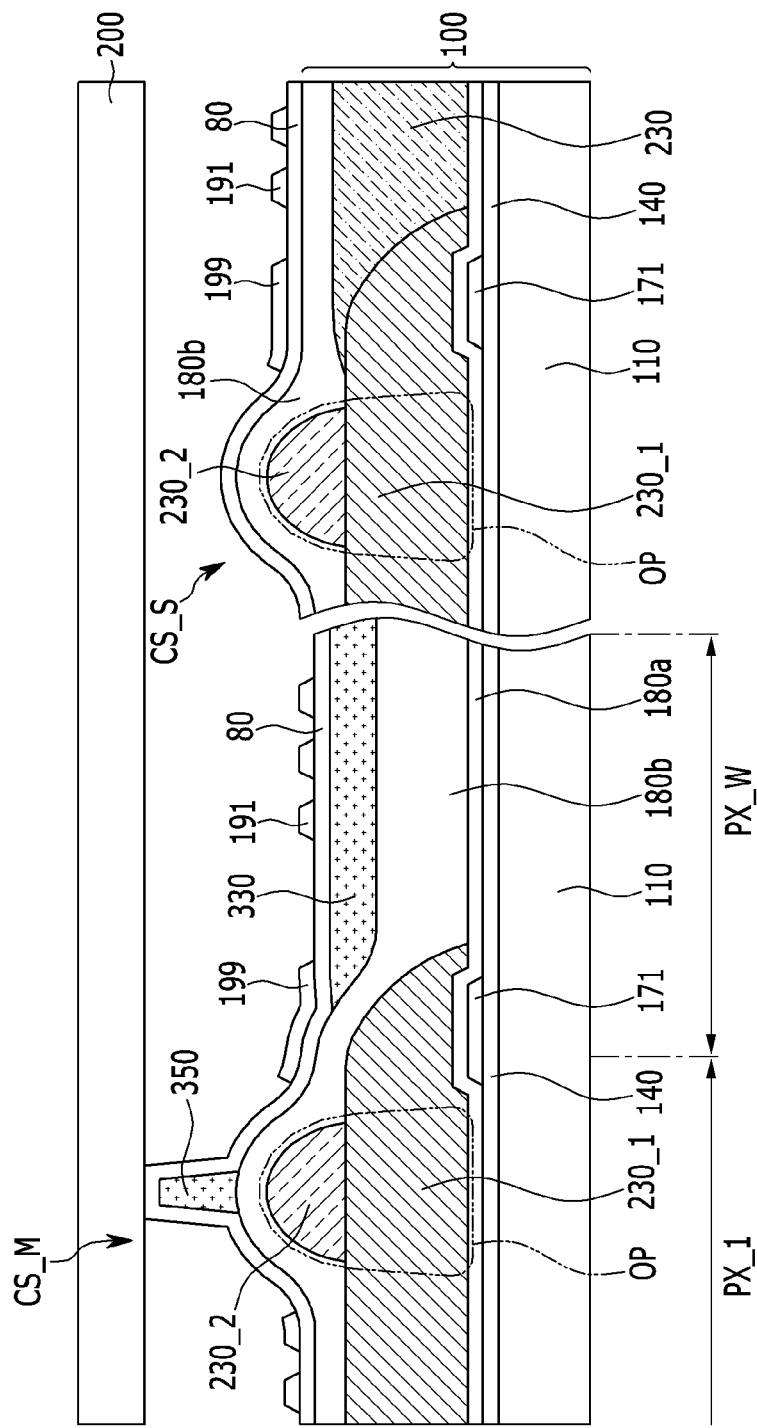

Next, referring to FIG. 14, the thin film transistor panel 100 according to the exemplary embodiment is almost the same as that of the exemplary embodiment illustrated in FIGS. 10A and 10B, but may further include a second passivation layer 180b positioned between the color filter 230 and the transparent filter 330. The second passivation layer 180b may be made of an organic insulating material, an inorganic insulating material such as SiOC, a compound of the organic insulating material and the inorganic insulating material, or the like. A dielectric constant of the second passivation layer 180b may be 3.5 or less, but is not limited thereto.

The second passivation layer 180b includes a portion covering the data line 171. The second passivation layer 180b may be formed on the entire surface of the substrate 110 as illustrated in FIG. 14, or may be formed only at a part of the substrate 110 so as to cover the data line 171. The second passivation layer 180b lowers a parasitic capacitance between the data line 171 and the pixel electrode 191 or the opposed electrode of the adjacent pixel to reduce a signal delay of the data line 171.

The viscosity of the second passivation layer 180b is properly controlled to control the flatness of the substrate 110. A height of the upper surface of the second passivation layer 180b in the transmitting area of the white pixel PX_W may be smaller than a height of the upper surface of the second passivation layer 180b in the transmitting areas of the color pixels PX_1, PX_2, and PX_3, and a difference in height may vary according to the viscosity of the second passivation layer 180b.

In the exemplary embodiment, the thickness of the color filter 230 positioned at the bottom may be about 1.5 µm to about 2.5 µm, but is not limited thereto.

According to the exemplary embodiment, a transparent filter 330 and a transparent spacing member 350 are formed on the second passivation layer 180b.

The transparent filter 330 includes a portion positioned in the transmitting area of the white pixel PX_W. The transparent filter 330 is positioned at a portion where the height of the upper surface of the second passivation layer 180b is small so as to compensate for a difference in height of the second passivation layer 180b. The difference in height according to a position may be reduced to some degree by controlling the viscosity of the second passivation layer 180b, but the height of the upper surface of the second passivation layer 180b in the white pixel PX_W may be relatively low. According to the exemplary embodiment, since the transparent filter 330 is formed in the transmitting area of the white pixel PX_W, the sum of the thicknesses of the second passivation layer 180b and the color filter 230 in the color pixels PX_1, PX_2, and PX_3 may be similar to or substantially the same as the sum of the thicknesses of the second passivation layer 180b and the transparent filter 330 in the white pixel PX_W. That is, the height of the upper surface of the second passivation layer 180b in the color pixels PX_1, PX_2, and PX_3 and the height of the upper surface of the transparent filter 330 in the white pixel PX_W are substantially similar to each other, and as a result, the flatness may be entirely improved.

As a result, a cell gap of the white pixel PX_W may be similar to or substantially the same as cell gaps of the color pixels PX_1, PX_2, and PX_3. Then, when the liquid crystal display panel is viewed from the side, it is possible to prevent a color coordinate from being distorted. Particularly, according to the exemplary embodiment, since the transparent filter 330 which is simultaneously formed with the transparent spacing member 350 is formed in the white pixel PX_W by using the second passivation layer 180b of which the viscosity is easily controlled, the overall flatness is more easily controlled.

In the exemplary embodiment, the capping layer 80 may be omitted.

Besides, various features and effects of the exemplary embodiment of FIGS. 10A and 10B may be equally applied even to the exemplary embodiment, and the duplicated description will be omitted.

Figure 15:
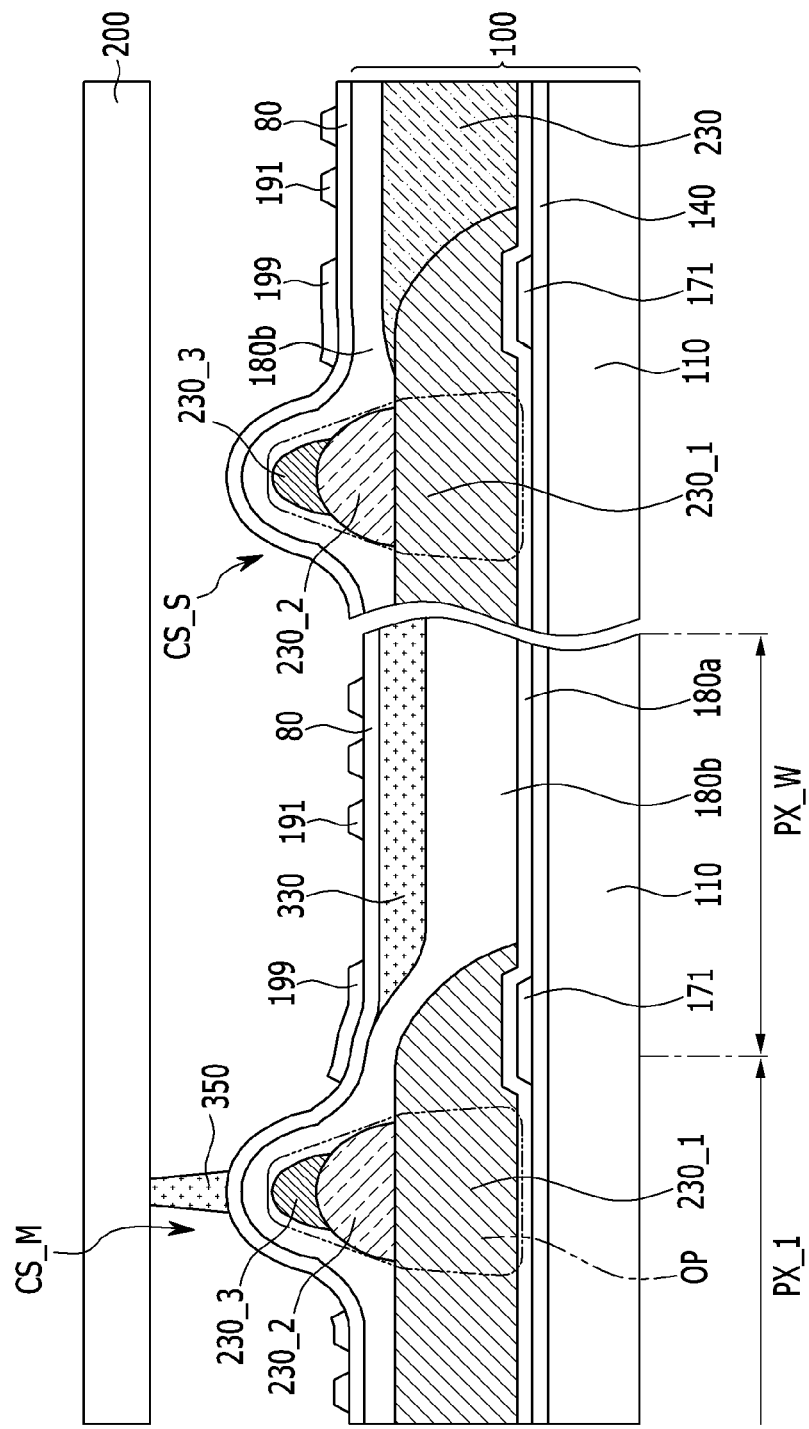

Next, FIG. 15 illustrates an example in which the thin film transistor panel 100 according to the exemplary embodiment is almost the same as that of the exemplary embodiment illustrated in FIG. 14, but three color filters 230 having different colors overlap with each other to form an overlapping portion OP. That is, the overlapping portion OP may include a first color filter 230_1, a second color filter 230_2 thereon, and a third color filter 230_3 thereon.

Besides, various features and effects of the exemplary embodiment of FIGS. 14 and 11 may be equally applied even to the exemplary embodiment, and the duplicated description will be omitted.

Figure 16:
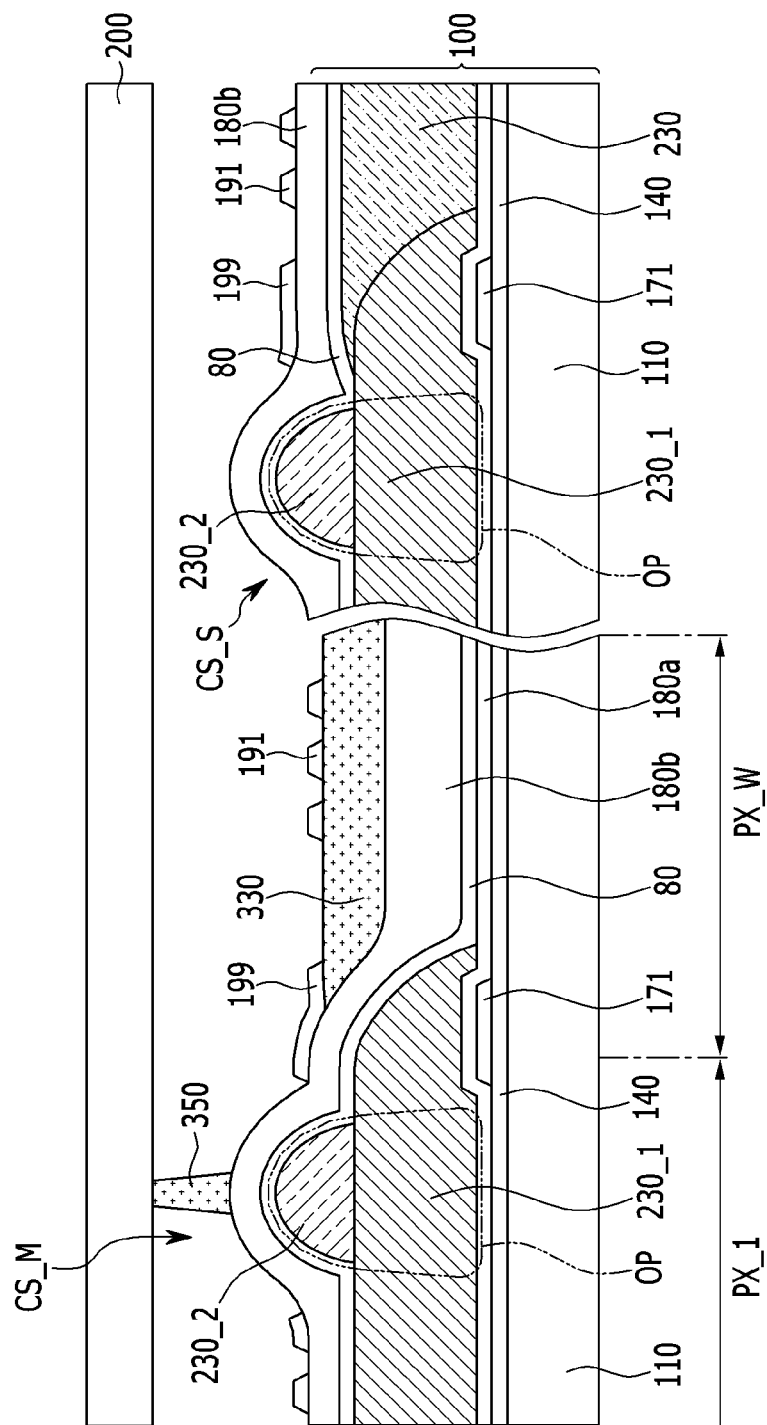

Next, referring to FIG. 16, the thin film transistor panel 100 according to the exemplary embodiment is almost the same as that of the exemplary embodiment illustrated in FIG. 14, but positions of the capping layers 80 may be different from each other. For example, as illustrated in FIG. 16, the capping layer 80 is positioned below the second passivation layer 180b, and may be positioned on the second color filter 230_2 of the overlapping portion OP and the first passivation layer 180a. The capping layer 80 may prevent the color filter 230 therebelow from being lifted and suppress the contamination of the liquid crystal layer 3 due to an organic material such as a solvent flowing into from the color filter 230, thereby preventing defects such as an afterimage which may be caused when the liquid crystal display panel is driven.

As a result, the plurality of pixel electrodes 191 and shielding electrodes 199 may be positioned on the transparent filter 330 and the second passivation layer 180b.

Figure 17:
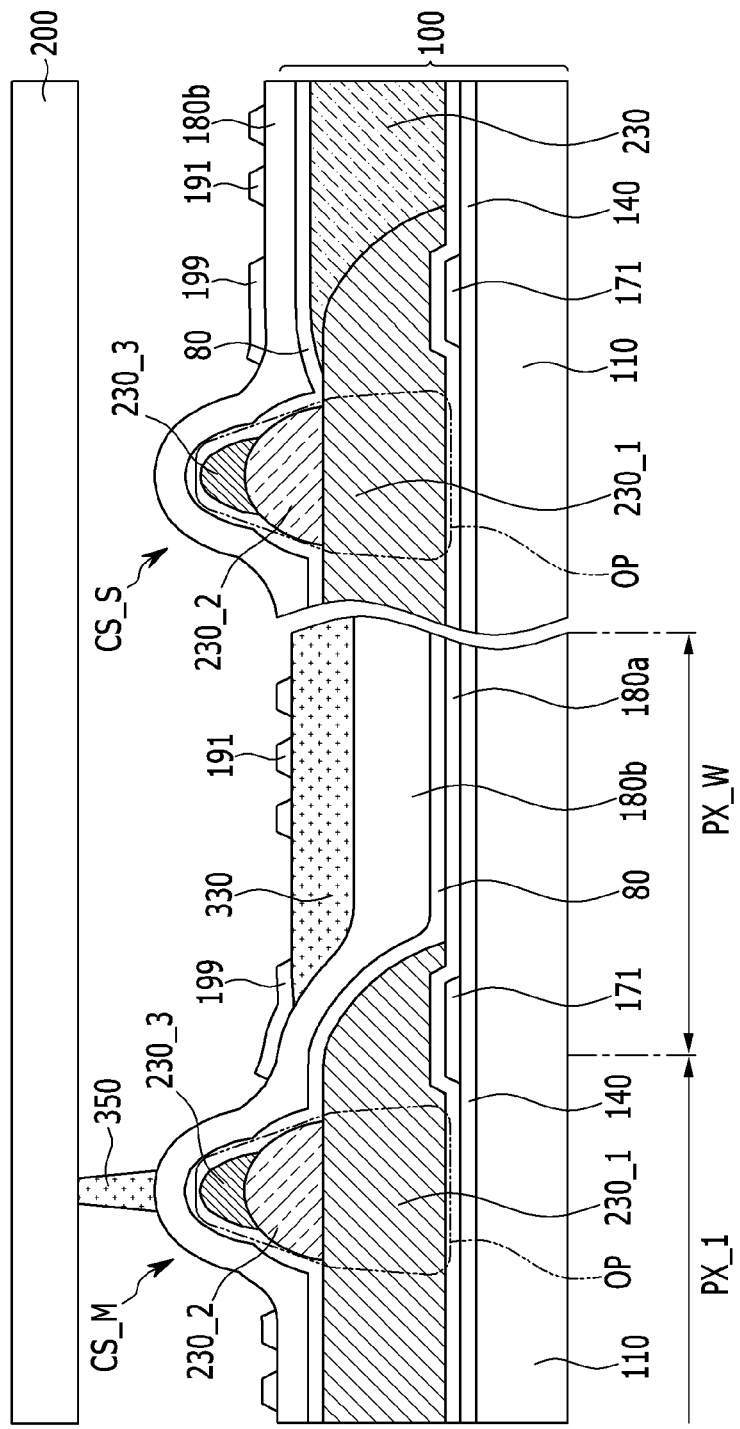

Next, FIG. 17 illustrates an example in which the thin film transistor panel 100 according to the exemplary embodiment is almost the same as that of the exemplary embodiment illustrated in FIG. 16, but three color filters 230 having different colors overlap with each other to form an overlapping portion OP. That is, the overlapping portion OP may include a first color filter 230_1, a second color filter 230_2 thereon, and a third color filter 230_3 thereon.

Besides, various features and effects of the exemplary embodiment of FIGS. 16 and 11 may be equally applied even to the exemplary embodiment, and the duplicated description will be omitted.

Figure 18:
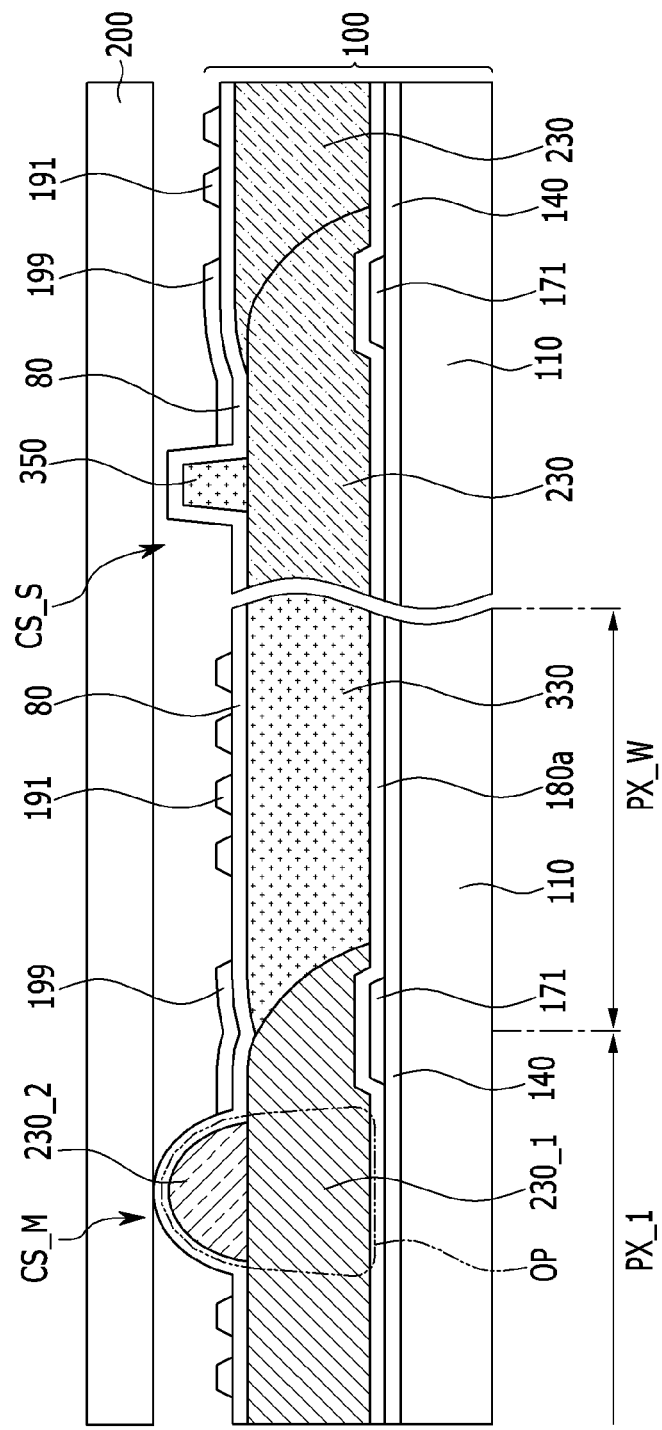

Referring now to FIG. 18, the thin film transistor panel 100 according to the exemplary embodiment is almost the same as that of the exemplary embodiment illustrated in FIG. 10, but the transparent spacing member 350 is not positioned on the overlapping portion OP, but positioned at another place except for the transmitting area of the pixel, for example, a place overlapping with the light blocking member (if present), the thin film transistor, and the signal lines such as the gate line and the data line 171.

In this case, heights of the upper surface of the overlapping portion OP where at least two of the plurality of color filters 230 overlap with each other and the upper surface of the transparent spacing member 350 may be different from each other and substantially the same as each other. As illustrated in FIG. 18, when the upper surface of the overlapping portion OP is higher than the upper surface of the transparent spacing member 350, the overlapping portion OP forms the main spacer CS_M together with the capping layer 80 thereon and the like, and the transparent spacing member 350 may form the sub spacer CS_S. Unlike this, when the upper surface of the overlapping portion OP and the upper surface of the transparent spacing member 350 are substantially the same as each other, the overlapping portion OP and the transparent spacing member 350 may serve as the same spacer CS.

Figure 19:
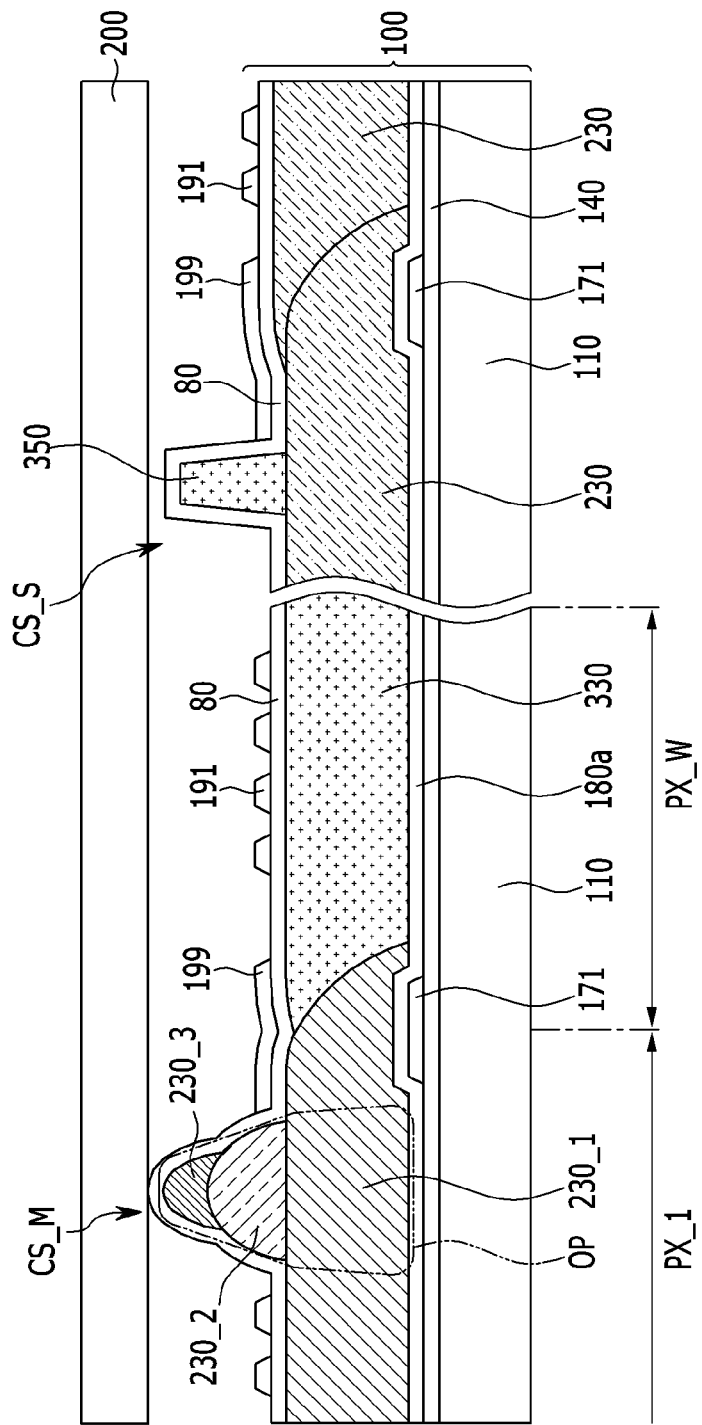

Next, FIG. 19 shows an example in which the opposed panel according to the exemplary embodiment is almost the same as that of the exemplary embodiment illustrated in FIG. 18, but three color filters 230 having different colors overlap with each other to form the overlapping portion OP. That is, the overlapping portion OP may include a first color filter 230_1, a second color filter 230_2 thereon, and a third color filter 230_3 thereon.

Besides, various features and effects of the exemplary embodiment of FIG. 18 and the exemplary embodiment of FIG. 11 may be equally applied even to the exemplary embodiment, and the duplicated description will be omitted.

Figure 20:
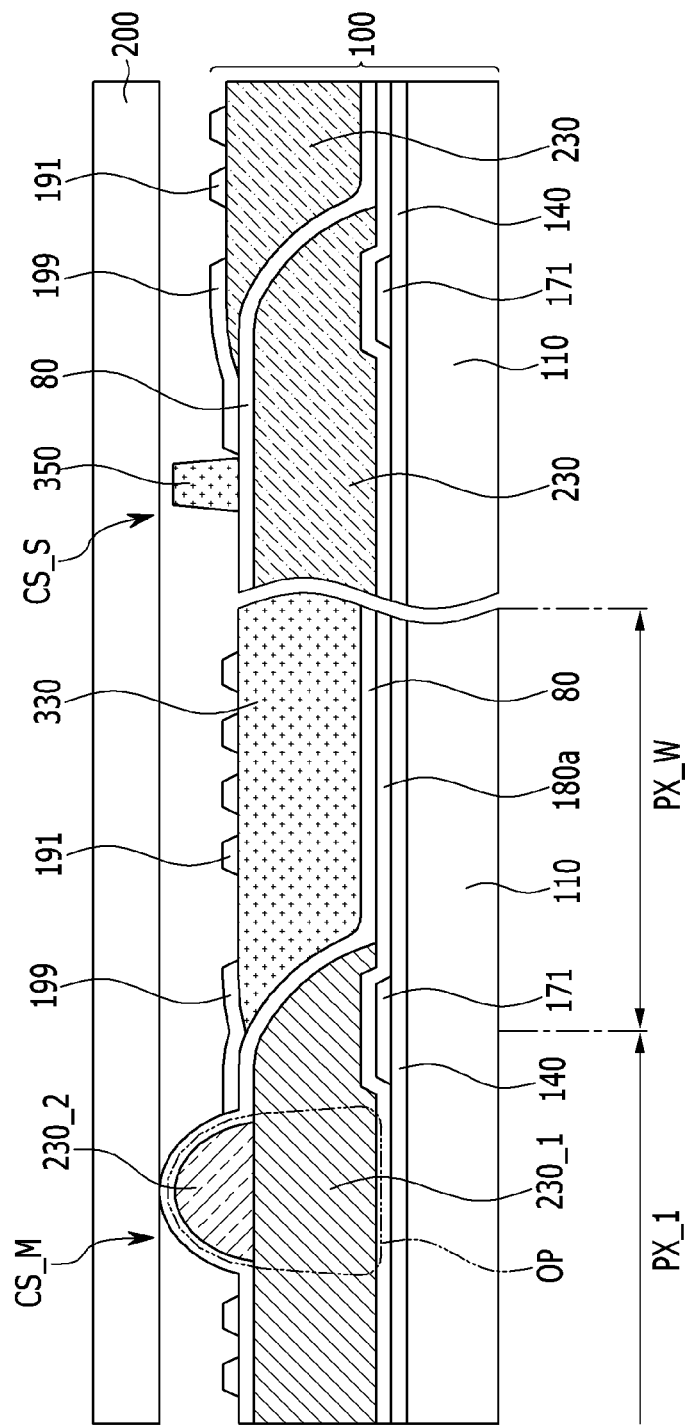

Next, referring to FIG. 20, the thin film transistor panel 100 according to the exemplary embodiment is almost the same as that of the exemplary embodiment illustrated in FIG. 18, but positions of the capping layers 80 may be different from each other. For example, as illustrated in FIG. 20, the capping layer 80 is positioned below the transparent filter 330 and the transparent spacing member 350, and may be positioned on the color filter 230 and the first passivation layer 180*a*. The capping layer 80 may prevent the color filter 230 therebelow from being lifted and suppress the contamination of the liquid crystal layer 3 due to an organic material such as a solvent flowing into from the color filter 230, thereby preventing defects such as an afterimage which may be caused when the liquid crystal display panel is driven.

As a result, the plurality of pixel electrodes 191 and shielding electrodes 199 may be positioned on the transparent filter 330.

Figure 21:
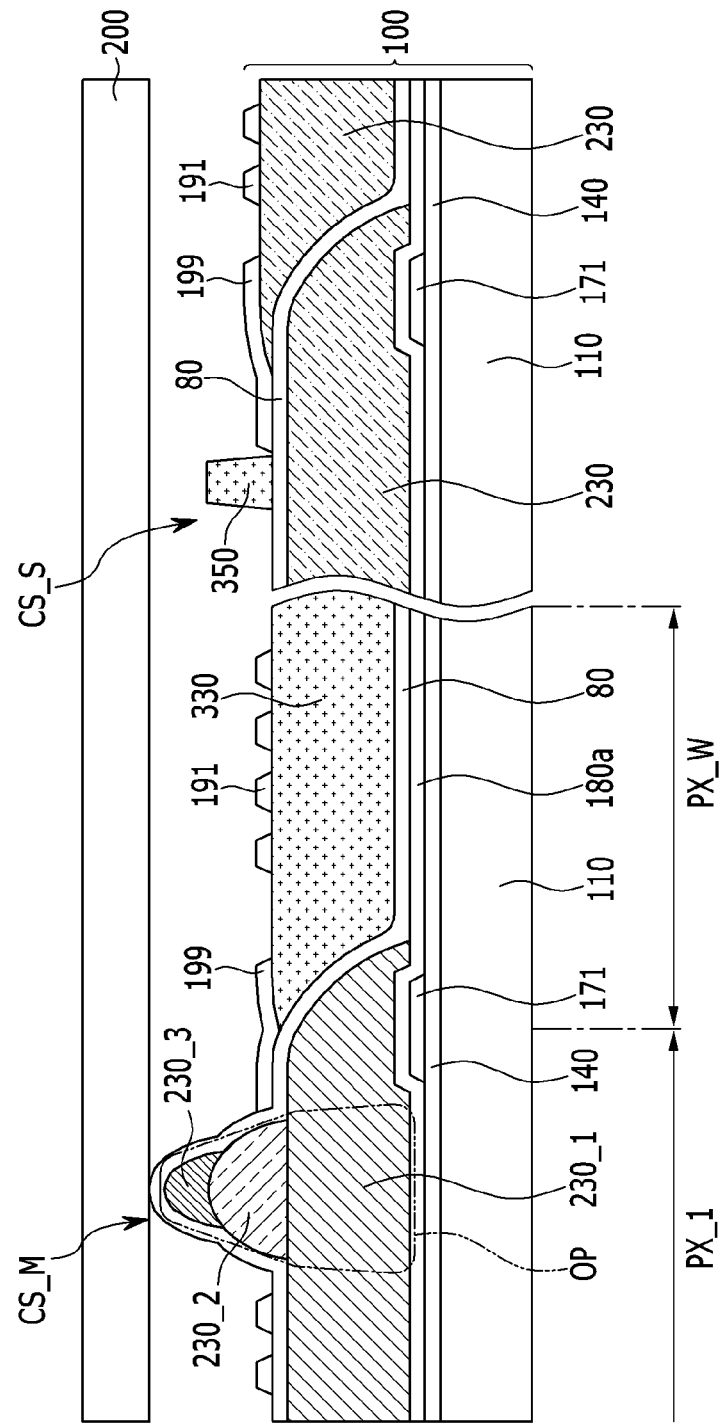

Next, FIG. 21 shows an example in which the opposed panel according to the exemplary embodiment is almost the same as that of the exemplary embodiment illustrated in FIG. 20, but three color filters 230 having different colors overlap with each other to form the overlapping portion OP. That is, the overlapping portion OP may include a first color filter 230_1, a second color filter 230_2 thereon, and a third color filter 230_3 thereon.

Besides, various features and effects of the exemplary embodiment of FIG. 20 and the exemplary embodiment of FIG. 11 may be equally applied even to the exemplary embodiment, and the duplicated description will be omitted.

Figure 22:
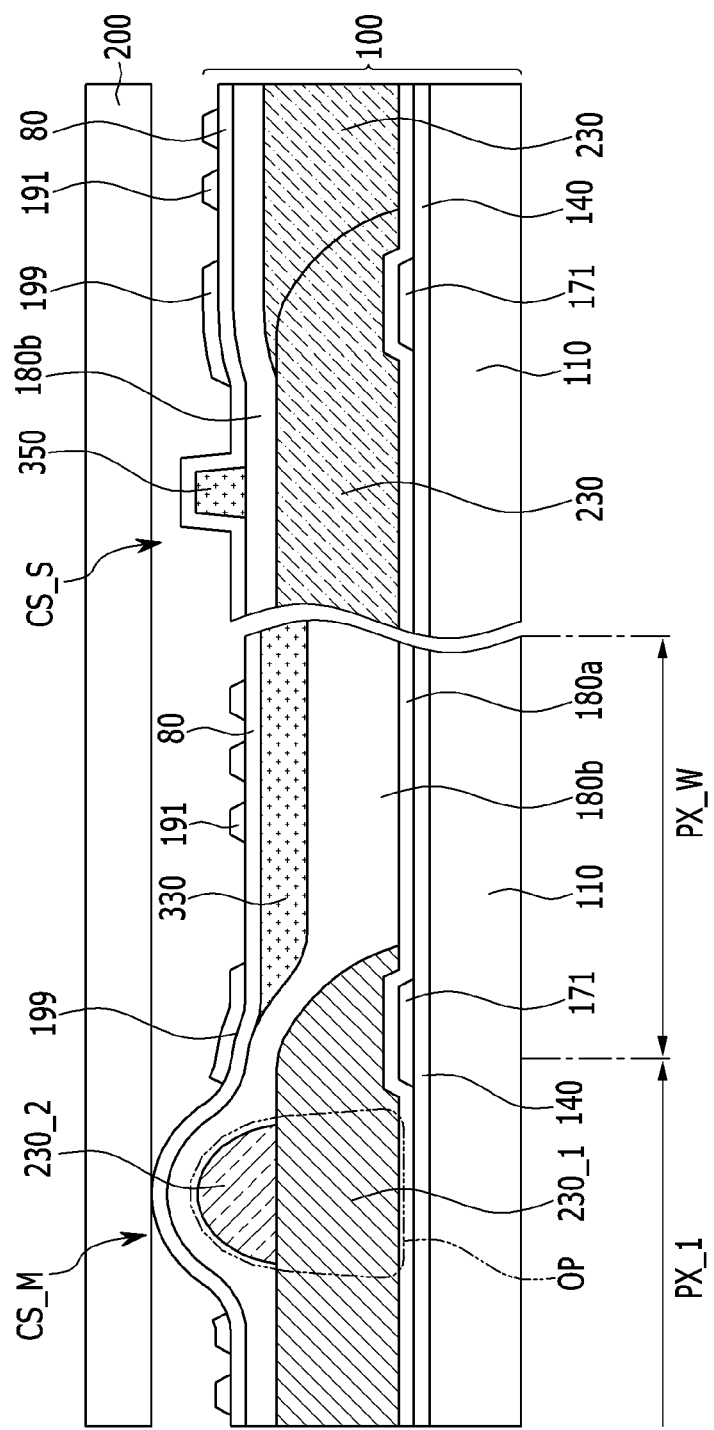

Next, referring to FIG. 22, the thin film transistor panel 100 according to the exemplary embodiment is almost the same as that of the exemplary embodiment illustrated in FIG. 18, but may further include a second passivation layer 180*b* positioned between the color filter 230 and the transparent filter 330. The second passivation layer 180*b* may be made of an organic insulating material, an inorganic insulating material such as SiOC, a compound of the organic insulating material and the inorganic insulating material, or the like. A dielectric constant of the second passivation layer 180*b* may be 3.5 or less, but is not limited thereto.

In the exemplary embodiment, the capping layer 80 may be omitted.

Besides, various features and effects of the exemplary embodiment of FIGS. 18 and 14 may be equally applied even to the exemplary embodiment, and the duplicated description will be omitted.

Figure 23:
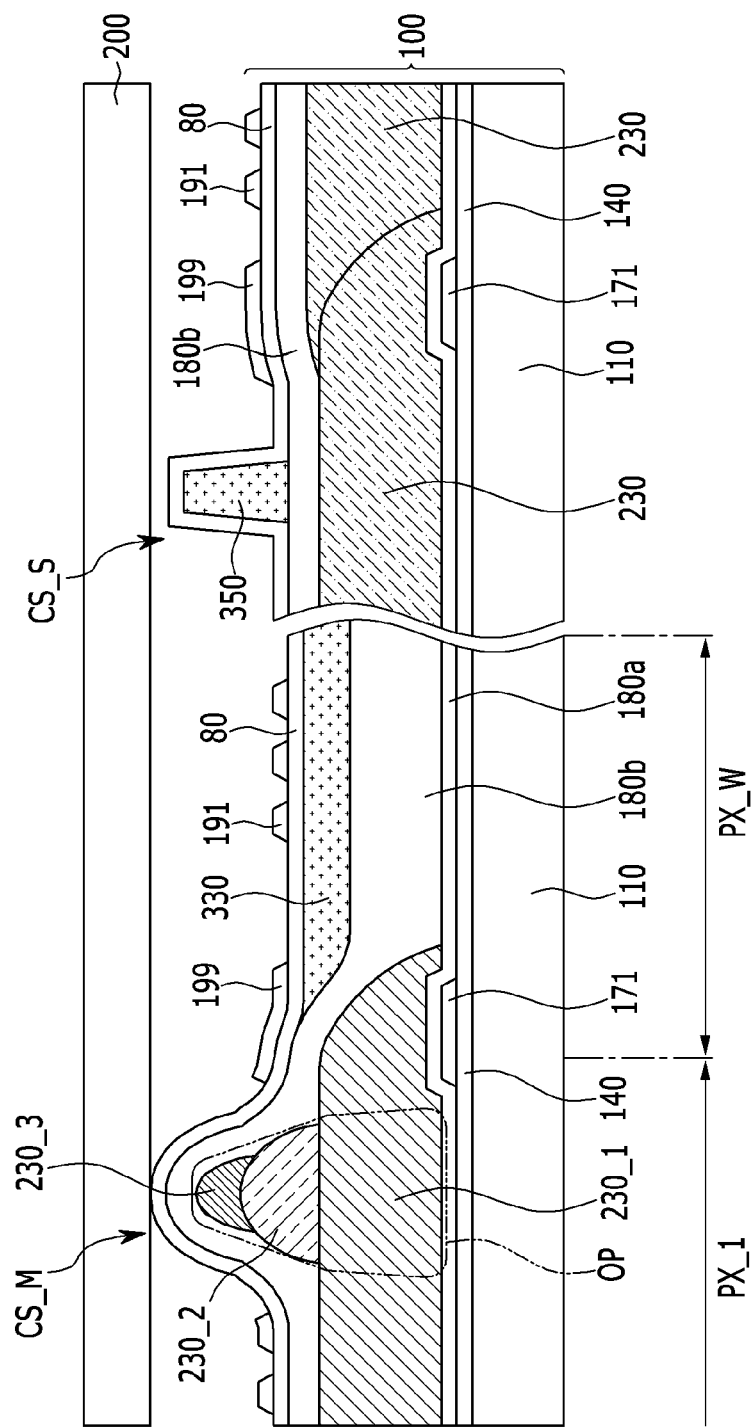

Next, FIG. 23 illustrates an example in which the thin film transistor panel 100 according to the exemplary embodiment is almost the same as that of the exemplary embodiment illustrated in FIG. 22, but three color filters 230 having different colors overlap with each other to form an overlapping portion OP. That is, the overlapping portion OP may include a first color filter 230_1, a second color filter 230_2 thereon, and a third color filter 230_3 thereon.

Besides, various features and effects of the exemplary embodiment of FIGS. 22 and 11 may be equally applied even to the exemplary embodiment, and the duplicated description will be omitted.

Figure 24:
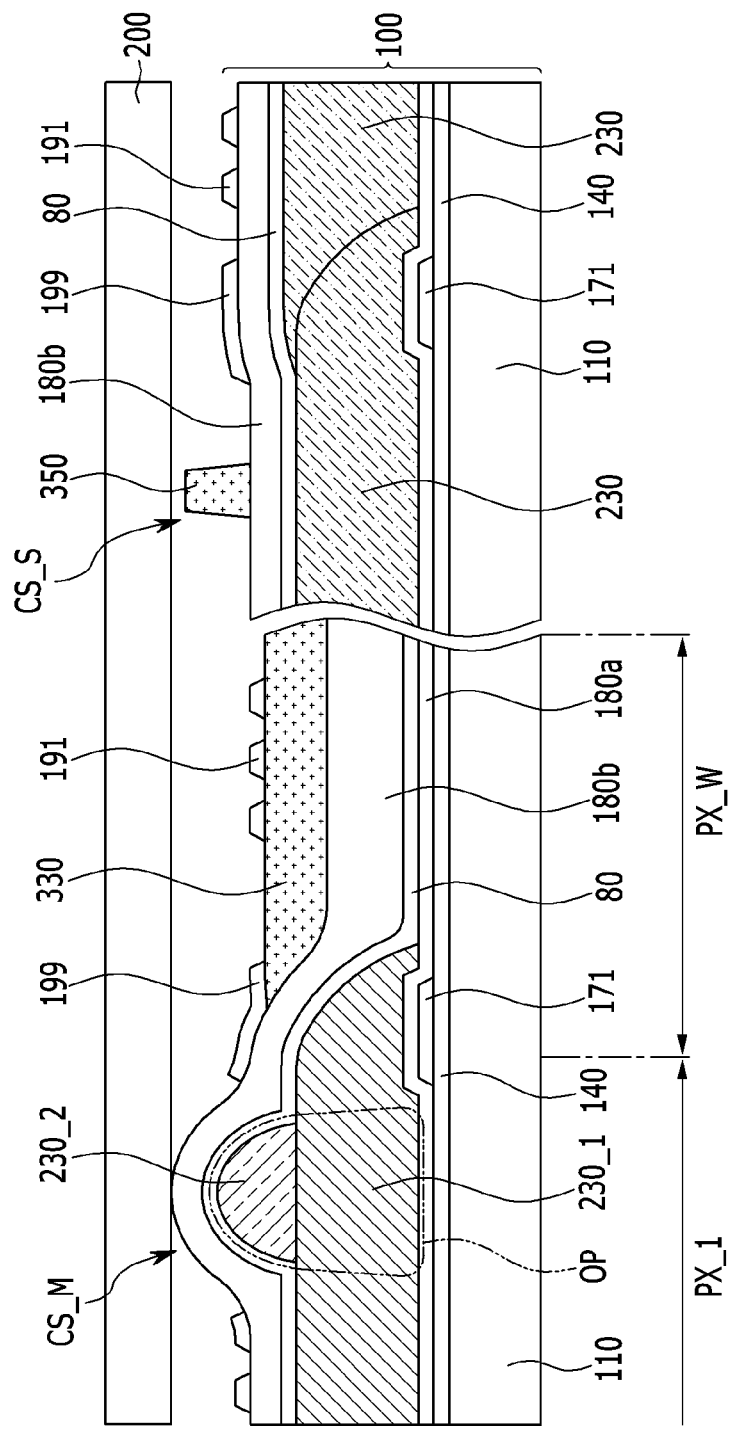

Next, referring to FIG. 24, the thin film transistor panel 100 according to the exemplary embodiment is almost the same as that of the exemplary embodiment illustrated in FIG. 22, but positions of the capping layers 80 may be different from each other. For example, as illustrated in FIG. 24, the capping layer 80 is positioned below the second passivation layer 180*b*, and may be positioned on the color filter 230 and the first passivation layer 180*a*. The capping layer 80 may prevent the color filter 230 therebelow from being lifted and suppress the contamination of the liquid crystal layer 3 due to an organic material such as a solvent flowing into from the color filter 230, thereby preventing defects such as an afterimage which may be caused when the liquid crystal display panel is driven.

As a result, the plurality of pixel electrodes 191 and shielding electrodes 199 may be positioned on the transparent filter 330 and the second passivation layer 180*b*.

Figure 25:
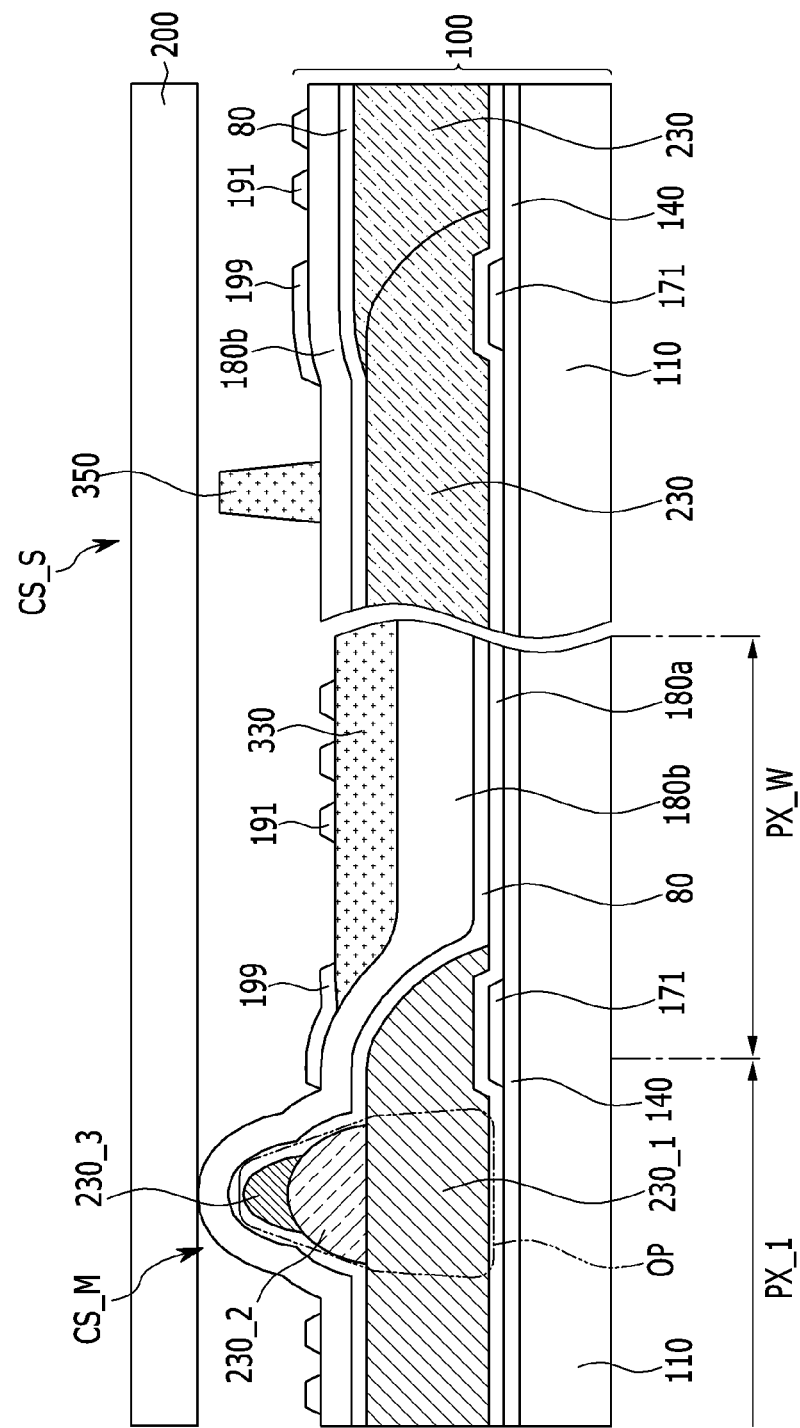

Next, FIG. 25 illustrates an example in which the thin film transistor panel 100 according to the exemplary embodiment is almost the same as that of the exemplary embodiment illustrated in FIG. 24, but three color filters 230 having different colors overlap with each other to form an overlapping portion OP. That is, the overlapping portion OP may include a first color filter 230_1, a second color filter 230_2 thereon, and a third color filter 230_3 thereon.

Besides, various features and effects of the exemplary embodiment of FIGS. 24 and 11 may be equally applied even to the exemplary embodiment, and the duplicated description will be omitted.

Figure 26:
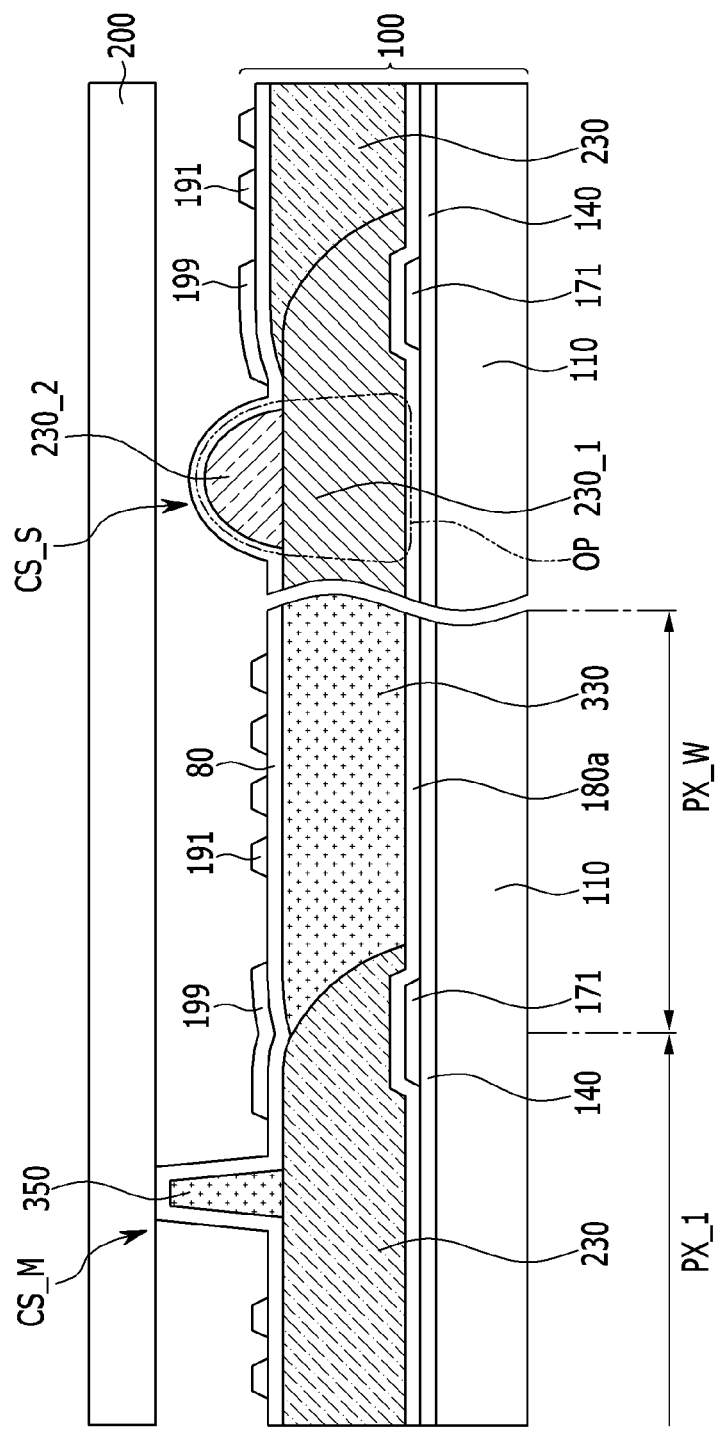

Next, FIG. 26 illustrates an example in which the thin film transistor panel 100 according to the exemplary embodiment is almost the same as that of the exemplary embodiment illustrated in FIG. 18, but the upper surface of the overlapping portion OP is lower than the upper surface of the transparent spacing member 350. In this case, the overlapping portion OP forms the sub spacer CS_S together with the overcoat layer 80 thereon and the like, and the transparent spacing member 350 may form the main spacer CS_M. Unlike this, when the upper surface of the overlapping portion OP and the upper surface of the transparent spacing member 350 are substantially the same as each other, the overlapping portion OP and the transparent spacing member 350 may serve as the same spacer CS.

Figure 27:
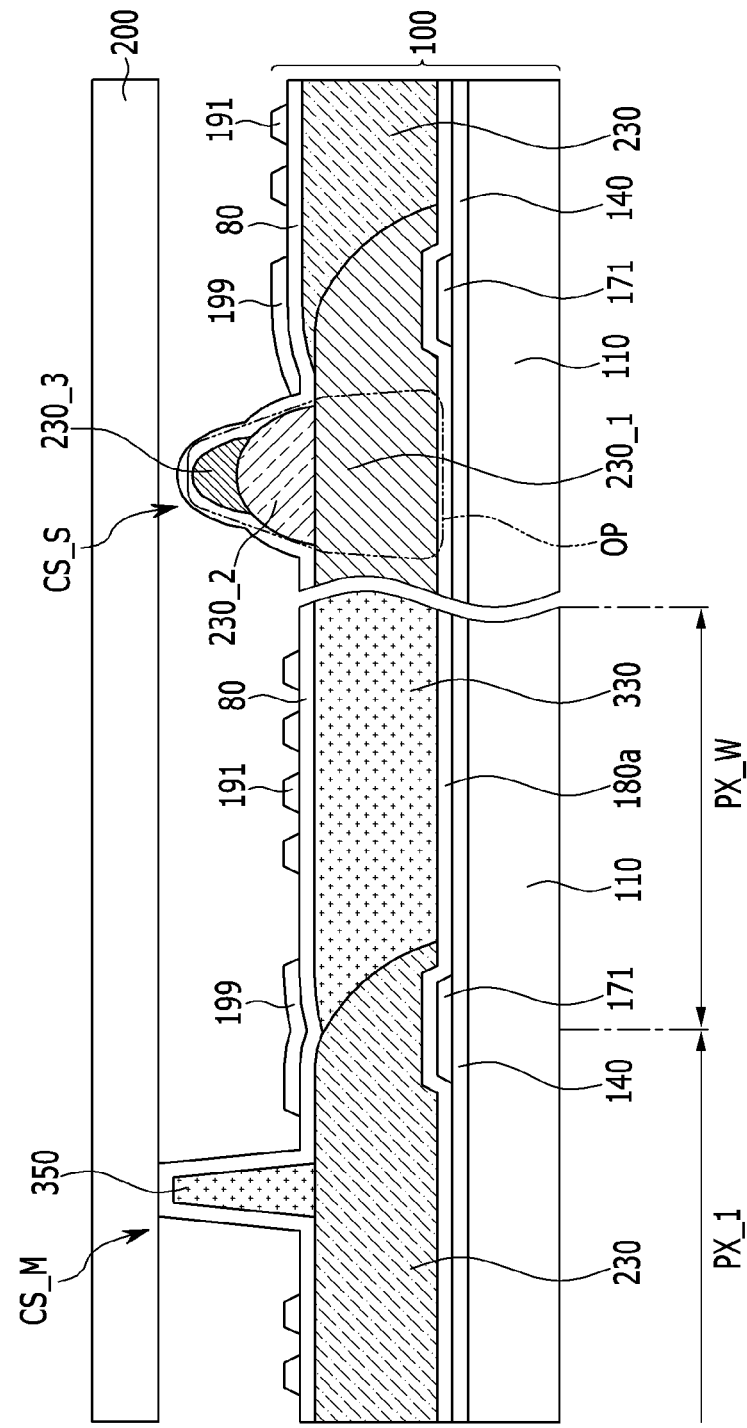

Next, FIG. 27 illustrates an example in which the opposed panel according to the exemplary embodiment is almost the same as that of the exemplary embodiment illustrated in FIG. 26, but three color filters 230 having different colors overlap with each other to form the overlapping portion OP. That is, the overlapping portion OP may include a first color filter 230_1, a second color filter 230_2 thereon, and a third color filter 230_3 thereon.

Besides, various features and effects of the exemplary embodiment of FIG. 26 and the exemplary embodiment of FIG. 11 may be equally applied even to the exemplary embodiment, and the duplicated description will be omitted.

Figure 28:
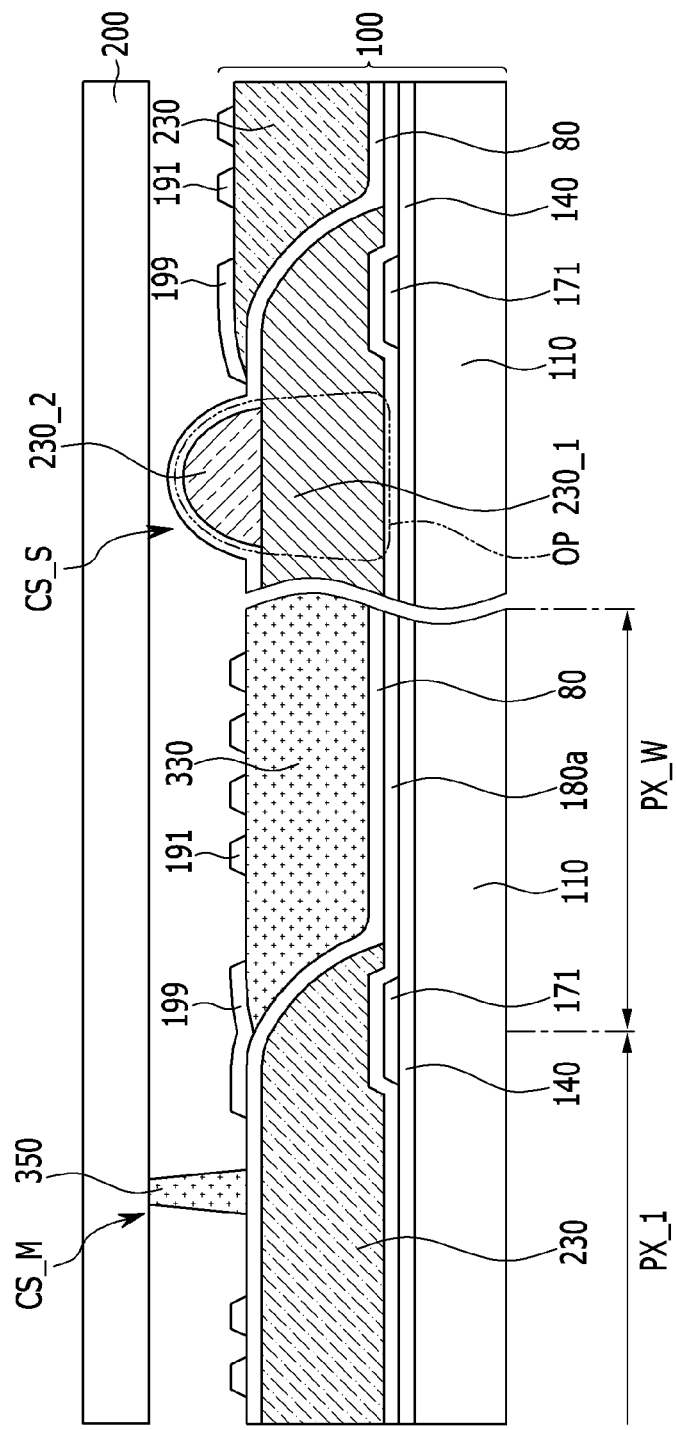

Next, referring to FIG. 28, the thin film transistor panel 100 according to the exemplary embodiment is almost the same as that of the exemplary embodiment illustrated in FIG. 26, but positions of the capping layers 80 may be different from each other. For example, as illustrated in FIG. 28, the capping layer 80 is positioned below the transparent filter 330 and the transparent spacing member 350, and may be positioned on the color filter 230 and the first passivation layer 180a. As a result, the plurality of pixel electrodes 191 and shielding electrodes 199 may be positioned on the transparent filter 330.

Figure 29:
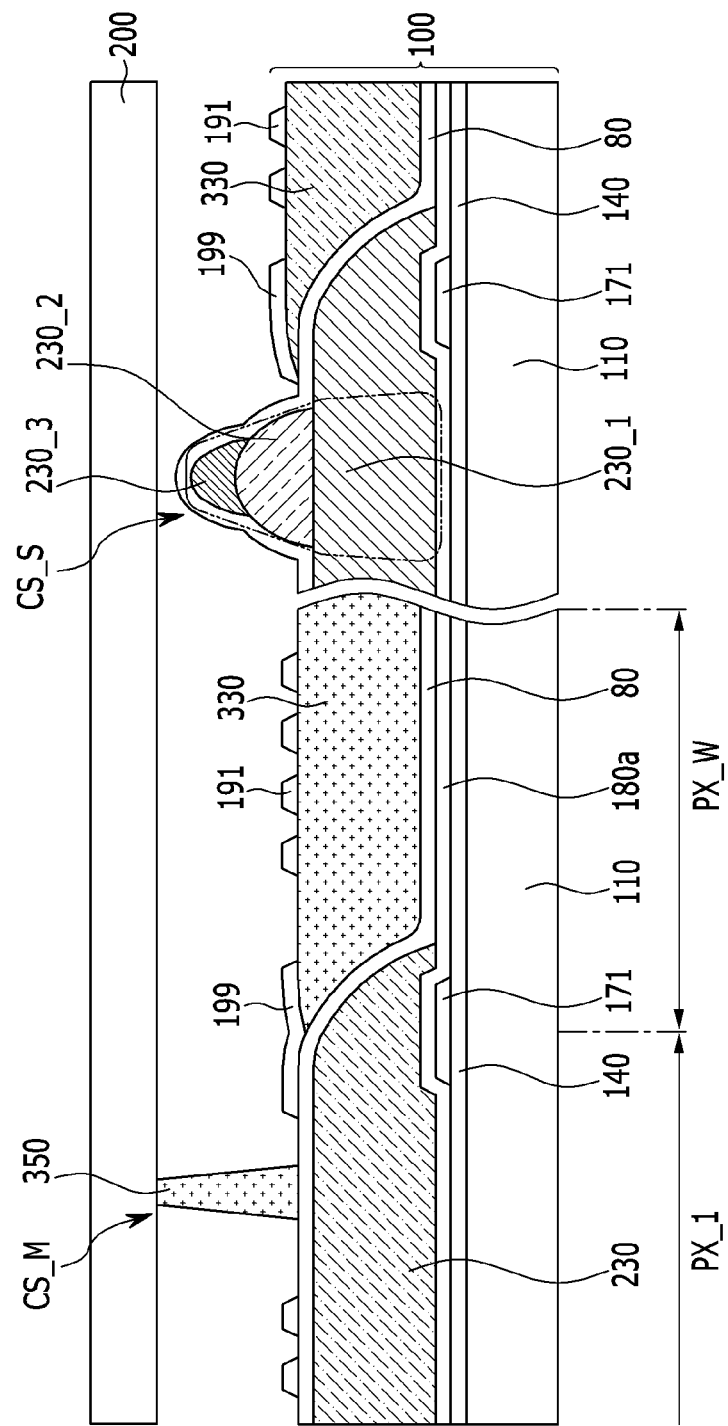

Next, FIG. 29 illustrates an example in which the opposed panel according to the exemplary embodiment is almost the same as that of the exemplary embodiment illustrated in FIG. 28, but three color filters 230 having different colors overlap with each other to form the overlapping portion OP. That is, the overlapping portion OP may include a first color filter 230_1, a second color filter 230_2 thereon, and a third color filter 230_3 thereon.

Besides, various features and effects of the exemplary embodiment of FIG. 28 and the exemplary embodiment of FIG. 11 may be equally applied even to the exemplary embodiment, and the duplicated description will be omitted.

Figure 30:
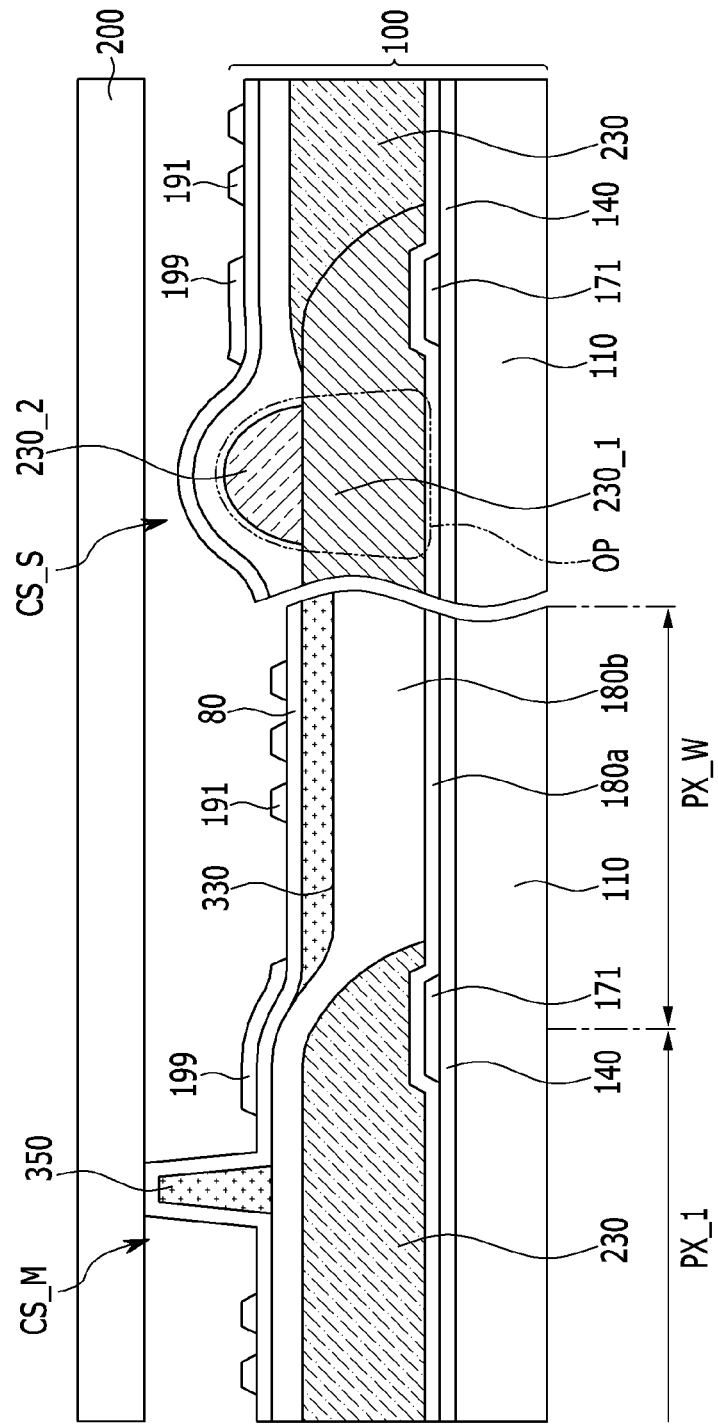

Next, referring to FIG. 30, the thin film transistor panel 100 according to the exemplary embodiment is almost the same as that of the exemplary embodiment illustrated in FIG. 26, but may further include a second passivation layer 180b positioned between the color filter 230 and the transparent filter 330. In the exemplary embodiment, the capping layer 80 may be omitted.

Besides, various features and effects of the exemplary embodiment of FIGS. 26 and 14 may be equally applied even to the exemplary embodiment, and the duplicated description will be omitted.

Figure 31:
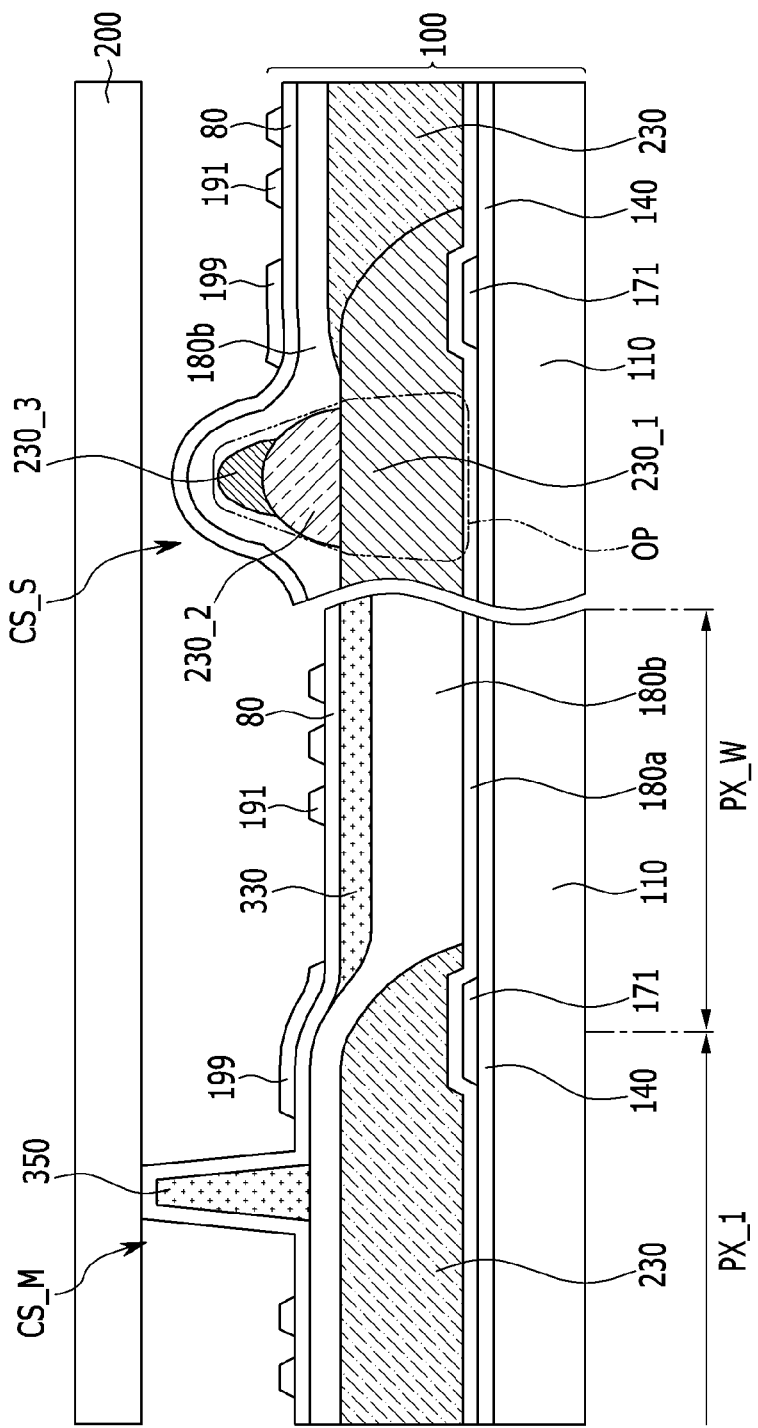

Next, FIG. 31 illustrates an example in which the thin film transistor panel 100 according to the exemplary embodiment is almost the same as that of the exemplary embodiment illustrated in FIG. 30, but three color filters 230 having different colors overlap with each other to form an overlapping portion OP. That is, the overlapping portion OP may include a first color filter 230_1, a second color filter 230_2 thereon, and a third color filter 230_3 thereon.

Figure 32:
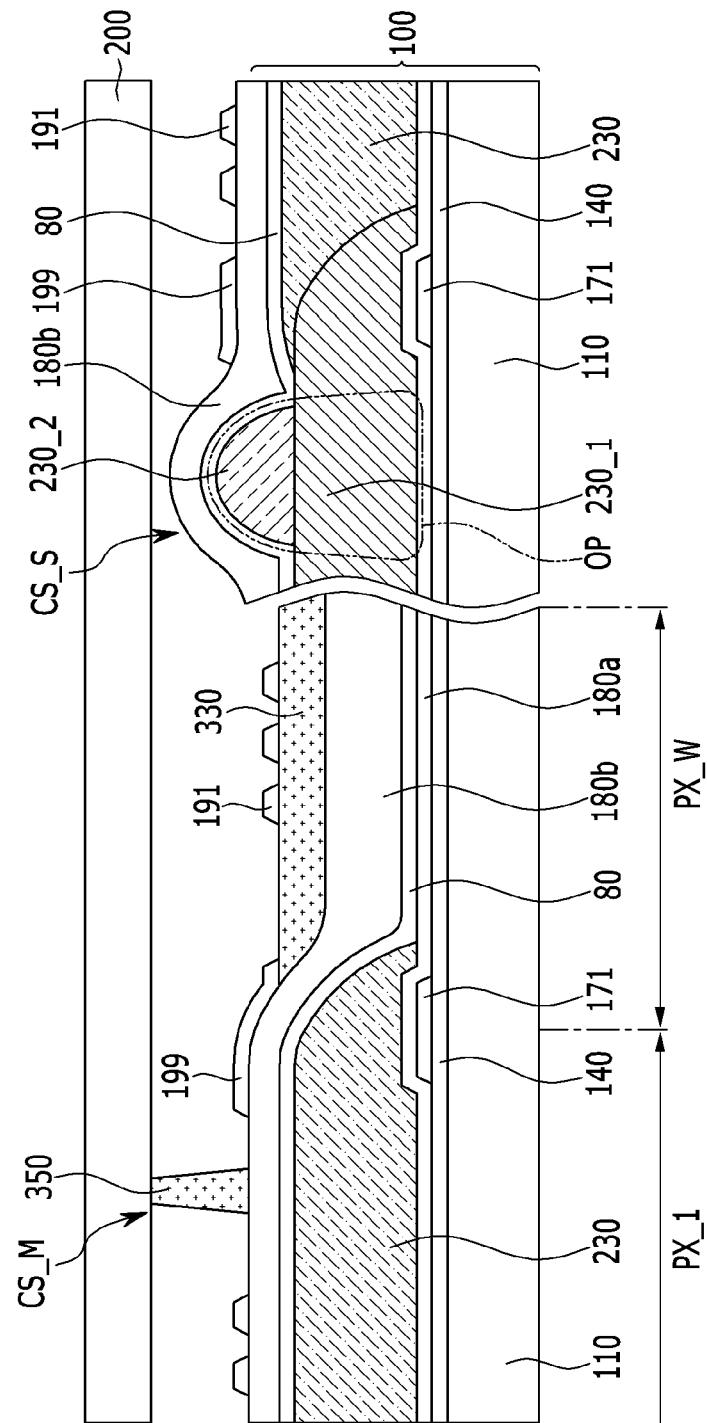

Next, referring to FIG. 32, the thin film transistor panel 100 according to the exemplary embodiment is almost the same as that of the exemplary embodiment illustrated in FIG. 30, but positions of the capping layers 80 may be different from each other. For example, as illustrated in FIG. 32, the capping layer 80 is positioned below the second passivation layer 180b, and may be positioned on the color filter 230 and the first passivation layer 180a. As a result, the plurality of pixel electrodes 191 and shielding electrodes 199 may be positioned on the transparent filter 330 and the second passivation layer 180b.

Next, FIG. 33 illustrates an example in which the thin film transistor panel 100 according to the exemplary embodiment is almost the same as that of the exemplary embodiment illustrated in FIG. 32, but three color filters 230 having different colors overlap with each other to form an overlapping portion OP. That is, the overlapping portion OP may include a first color filter 230_1, a second color filter 230_2 thereon, and a third color filter 230_3 thereon.

Figure 34B:
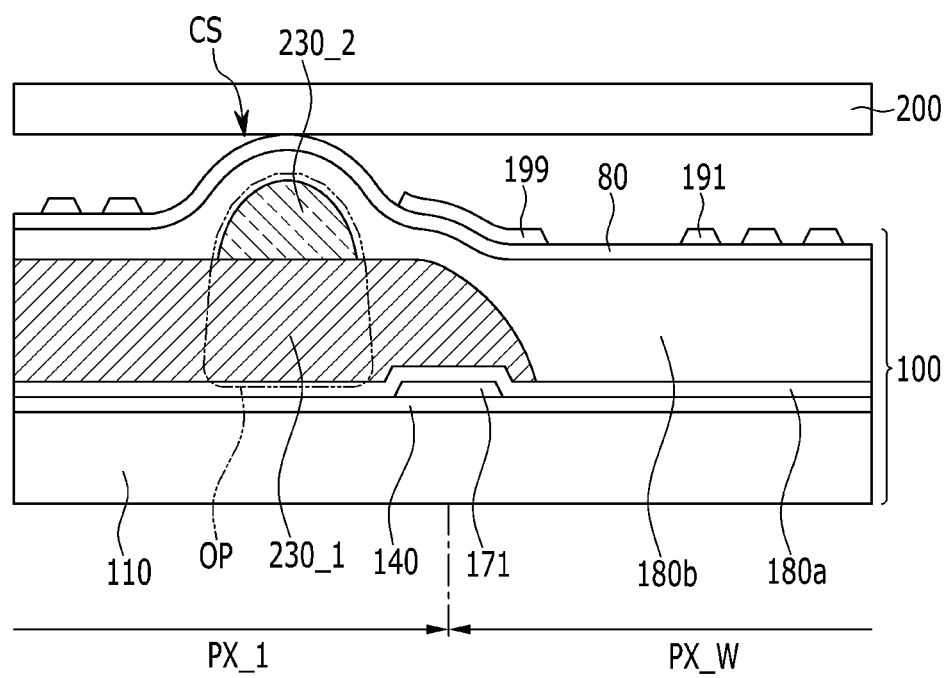
FIGS. 34B and 35, 36, 37 are cross-sectional views illustrating the liquid crystal display panel illustrated in FIG. 34A taken along line XXXIV-XXXIV, respectively.

Next, referring to FIGS. 34A and 34B, the thin film transistor panel 100 according to the exemplary embodiment is almost the same as that of the exemplary embodiment illustrated in FIG. 14, but the transparent filter 330 and the transparent spacing member 350 are not formed. That is, in the white pixel PX_W, a separate transparent filter is not formed and a separate spacer for maintaining the cell gap is not formed. Accordingly, the photolithography process for forming the transparent filter and the transparent spacing member may be omitted, and as a result, the manufacturing process is more simplified. Instead, the upper surface of the overlapping portion OP formed when at least two of the different color filters 230 overlap with each other is formed to be higher than the periphery to serve as the spacer CS maintaining the cell gap together with the overlapping portion OP, the second passivation layer 180b thereon, the capping layer 80, and the like.

The transmitting area of the white pixel PX_W may be almost filled by the second passivation layer 180b. Accordingly, the thickness of the second passivation layer 180b positioned in the transmitting area of the white pixel PX_W may be substantially the same as or larger than the thickness of the color filter 230 positioned in the transmitting area of the color pixels PX_1, PX_2, and PX_3. Further, the thickness of the second passivation layer 180b positioned in the transmitting area of the white pixel PX_W may be larger than the second passivation layer 180b positioned on the color filters 230 of the color pixels PX_1, PX_2, and PX_3. Accordingly, the height of the upper surface of the second passivation layer 180b in the white pixel PX_W may be the same as or larger than the height of the upper surface of the color filter 230 positioned in the transmitting area of the color pixels PX_1, PX_2, and PX_3.

Since the upper surface of the second passivation layer 180b in the white pixel PX_W sags below the upper surface of the second passivation layer 180b in the color pixels PX_1, PX_2, and PX_3, the second passivation layer 180b may include a high-flatness organic material having sufficient viscosity so as to prevent the cell gap of the white pixel PX_W from being different from the cell gap of the color pixels PX_1, PX_2, and PX_3.

Figure 35:
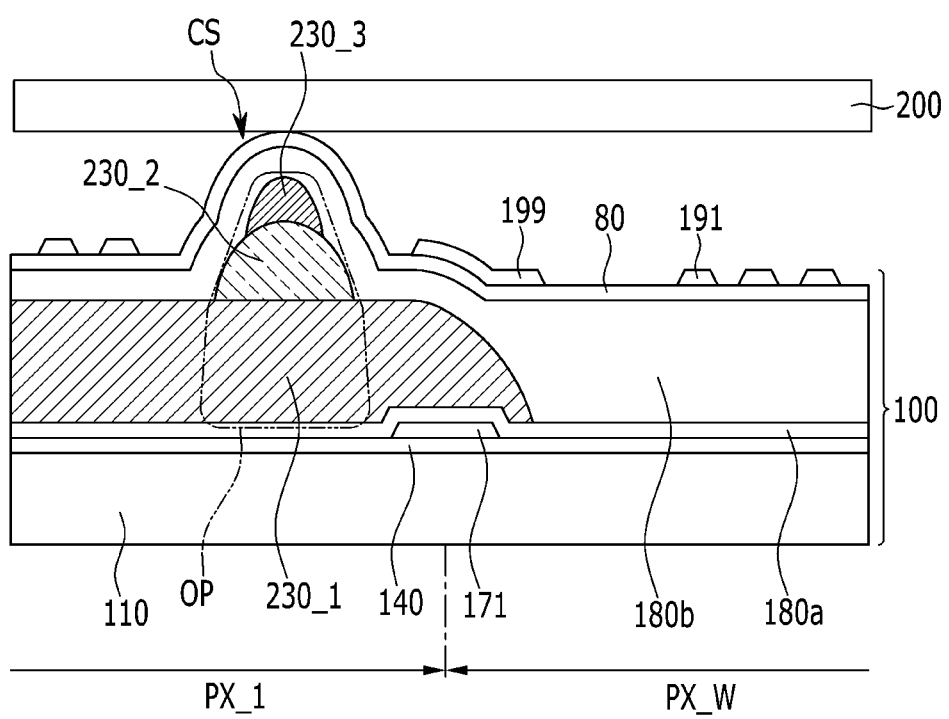

Next, FIG. 35 illustrates an example in which the thin film transistor panel 100 according to the exemplary embodiment is almost the same as that of the exemplary embodiment illustrated in FIGS. 34A and 34B, but three color filters 230 having different colors overlap with each other to form an overlapping portion OP. That is, the overlapping portion OP may include a first color filter 230_1, a second color filter 230_2 thereon, and a third color filter 230_3 thereon.

Figure 36:
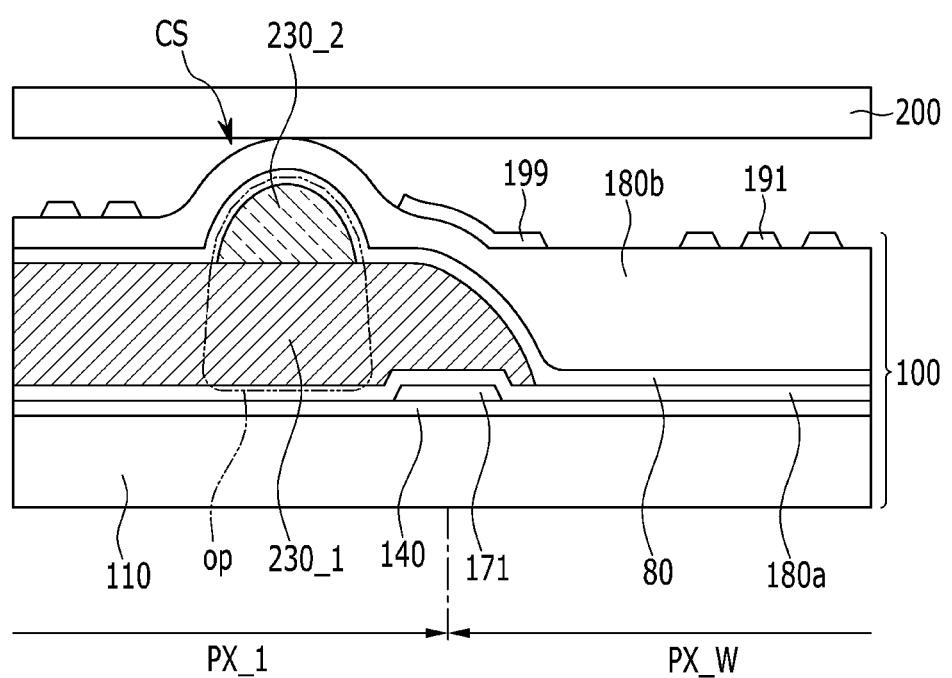

Next, referring to FIG. 36, the thin film transistor panel 100 according to the exemplary embodiment is almost the same as that of the exemplary embodiment illustrated in FIGS. 34A and 34B, but positions of the capping layers 80 may be different from each other. For example, as illustrated in FIG. 36, the capping layer 80 is positioned below the second passivation layer 180b, and may be positioned on the second color filter 230_2 of the overlapping portion and the first passivation layer 180a. As a result, a plurality of pixel electrodes 191 and shielding electrodes 199 may be positioned on the second passivation layer 180b.

Figure 37:
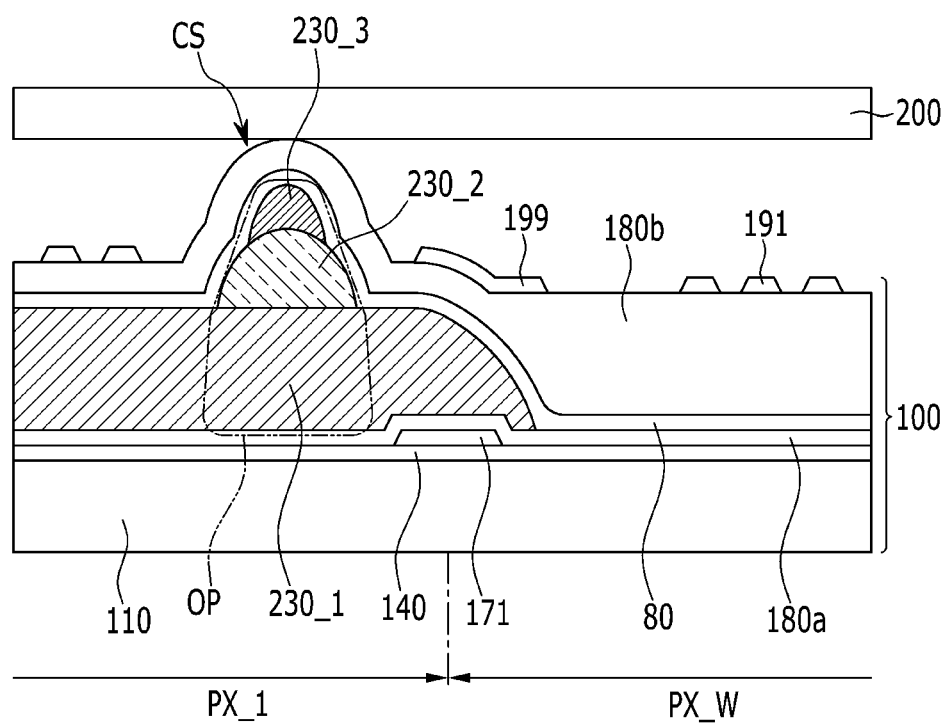

Next, FIG. 37 illustrates an example in which the opposed panel according to the exemplary embodiment is almost the same as that of the exemplary embodiment illustrated in FIG. 36, but three color filters 230 having different colors overlap with each other to form the overlapping portion OP. That is, the overlapping portion OP may include a first color filter 230_1, a second color filter 230_2 thereon, and a third color filter 230_3 thereon.

Next, a liquid crystal display panel according to an exemplary embodiment will be described with reference to FIGS. 38 to 44. The same constituent elements as the exemplary embodiments described above designate the same reference numerals, and the duplicated description is omitted, but differences will be mainly described.

Figure 38:
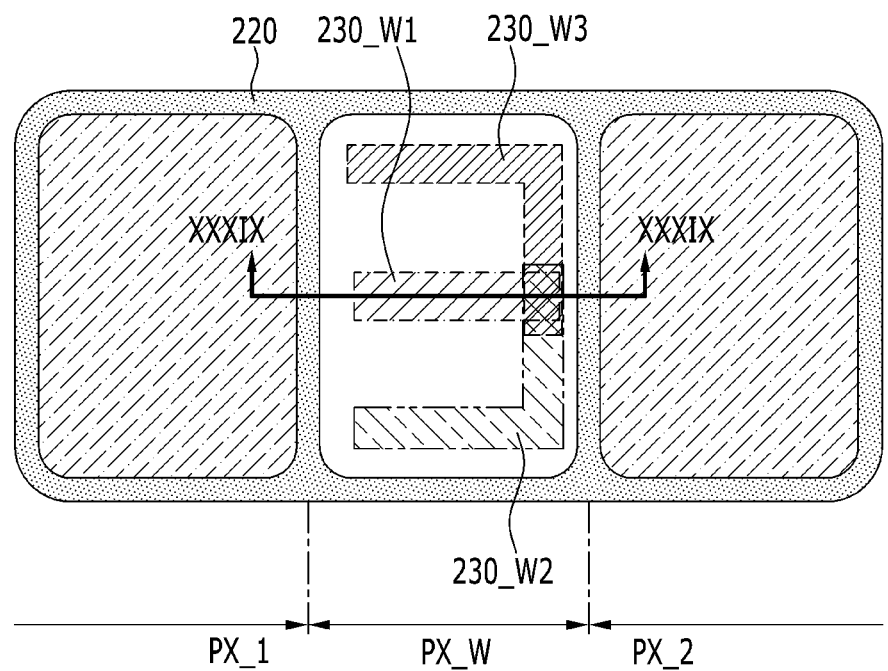
FIG. 38 is a layout view of three adjacent pixels of a liquid crystal display panel according to still another exemplary embodiment.

FIG. 38 is a layout view of three adjacent pixels of a liquid crystal display panel according to still another exemplary embodiment, and FIGS. 39 to 44 are cross-sectional views illustrating the liquid crystal display panel illustrated in FIG. 38 taken along line XXXIX-XXXIX, respectively.

The liquid crystal display panel according to the exemplary embodiment is almost the same as those of the exemplary embodiments described above, but positions, structures, and the like of the color filters 230 may be different from each other.

Referring to FIG. 38, transmitting areas of color pixels PX_1 PX_2, and PX_3 and a white pixel PX_W may be defined by openings of the light blocking member 220. According to the exemplary embodiment, the color filter 230 is positioned in the transmitting area of the white pixel PX_W. The color filter 230 positioned in the transmitting area of the white pixel PX_W is distinguished from the color filters 230 positioned in the color pixels PX_1 PX_2, and PX_3 to be called color filters in white 230_W1, 230_W2, and 230_W3. FIG. 38 illustrates an example in which three different color filters 230_W1, 230_W2, 230_W3 are positioned in one white pixel PX_W, but is not limited thereto, and two different color filters may be positioned.

A planar shape and a cross-sectional structure of the color filters in white 230_W1, 230_W2, and 230_W3 may be variously set. Referring to FIG. 38, the color filters in white 230_W1, 230_W2, and 230_W3 according to the exemplary embodiment include portions which do not overlap with each other and are elongated in a horizontal direction or a vertical direction, and portions of which at least parts overlap with each other. Particularly, the elongated direction in each of the color filters in white 230_W1, 230_W2, and 230_W3 may not be parallel to an extending direction of a long side of the white pixel PX_W. That is, as illustrated in FIG. 38, when the white pixel PX_W is longer in the vertical direction than the horizontal direction, the extending direction of each of the color filters in white 230_W1, 230_W2, and 230_W3 may be substantially in a horizontal direction. Further, elongated directions of the plurality of color filters in white 230_W1, 230_W2, and 230_W3 may be parallel to each other.

A portion where at least two of the plurality of color filters in white 230_W1, 230_W2, and 230_W3 positioned in one white pixel PX_W overlap with each other is similar to the overlapping portion of the liquid crystal display panel according to the exemplary embodiments described above.

An example in which the color filter 230 and the light blocking member 220 are positioned on the opposed panel 200 will be first described with reference to FIGS. 38 to 40.

The light blocking member 220 including an opening is positioned on the substrate 210, and a plurality of color filters 230 is positioned thereon. As described above, at least two color filters 230 are formed in the transmitting area of the white pixel PX_W to configure the color filters in white 230_W1, 230_W2, and 230_W3. The portion where at least two of the color filters in white 230_W1, 230_W2, and 230_W3 overlap with each other is distinguished from the overlapping portion of the above exemplary embodiment to be called an overlapping portion in white WOP. The lowest color filter of the overlapping portion in white WOP is called a first color filter 230_1, and a color filter positioned at an n-th (n is a natural number of 2 or more) position thereon is called an n-th color filter 230_n. The color filters 230_1, 230_2, 230_3 in FIGS. 39-44 may correspond to the color filters in white 230_W1, 230_W2, and 230_W3, respectively, as illustrated in FIG. 38. Since an area, a thickness, and the like of the overlapping area of the color filters forming the overlapping portion in white WOP are the same as those described above, the detailed description will be omitted herein.

The overlapping portion in white WOP may be connected with the portions where the color filters in white 230_W1, 230_W2, and 230_W3 do not overlap with each other and are elongated, and as a result, the stability of the overlapping portion in white WOP may be increased.

An overcoat layer 250 is positioned on the color filter 230 and the light blocking member 220. The flatness on the substrate 210 may be controlled by properly controlling the viscosity of the overcoat layer 250. That is, the height of the upper surface of the overcoat layer 250 in the transmitting area of the white pixel PX_W and the height of the upper surface of the overcoat layer 250 in the transmitting area of the color pixels PX_1, PX_2, and PX_3 may be substantially equally adjusted by properly decreasing the viscosity of the overcoat layer 250. Particularly, since at least two of color filters in white 230_W1, 230_W2, and 230_W3 are positioned in the transmitting area of the white pixel PX_W, the upper surface of the overcoat layer 250 may be prevented from being sunk in the white pixel PX_W, and as a result, the flatness may be more improved.

The overlapping portion in white WOP and the overcoat layer 250 thereon have upper surfaces higher than the periphery to form a spacer CS maintaining a cell gap of the liquid crystal layer 3. Accordingly, a separate spacer needs not to be formed to reduce the number of photomasks.

An opposed electrode 270 is positioned on the overcoat layer 250. The opposed electrode 270 may be patterned, and may not be formed on the overlapping portion in white WOP forming the spacer.

Figure 39:
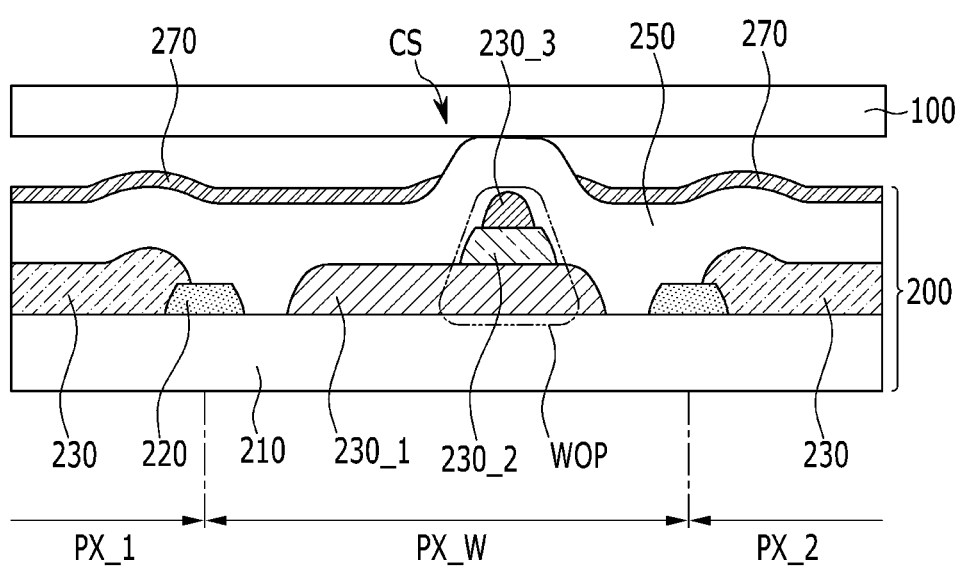
FIGS. 39, 40, 41, 42, 43, 44 are cross-sectional views illustrating the liquid crystal display panel illustrated in FIG. 38 taken along line XXXIX-XXXIX, respectively.
Figure 40:
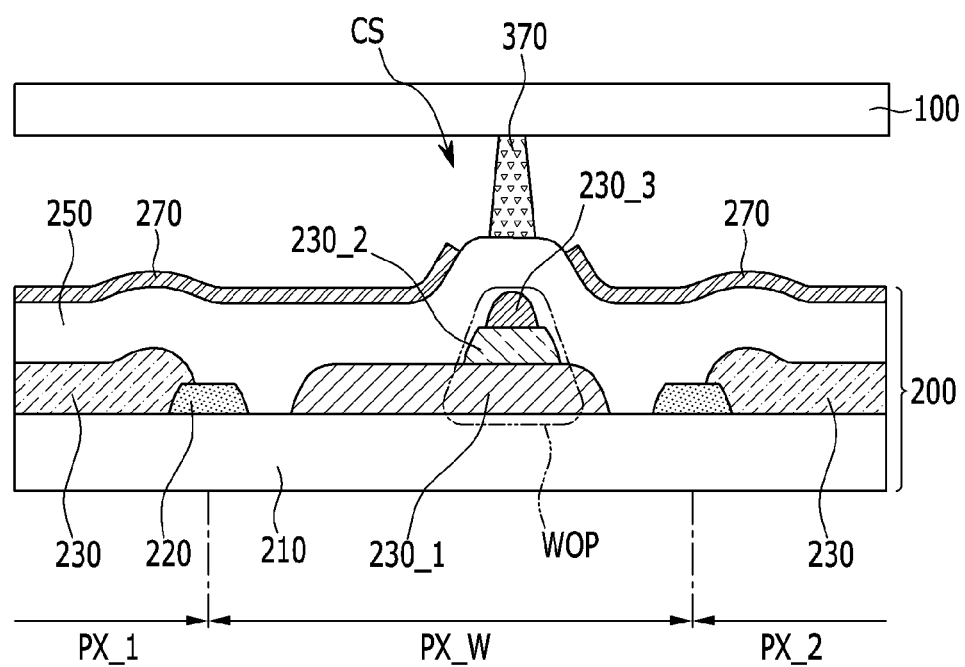

The exemplary embodiment illustrated in FIG. 40 is almost the same as the exemplary embodiment illustrated in FIG. 39, but a spacing member 370 is further positioned on the overlapping portion in white WOP. The overlapping portion in white WOP, the overcoat layer 250 thereon, and the spacing member 370 have upper surfaces higher than the periphery to form the spacer CS. Particularly, in the case of forming the spacer CS illustrated in FIG. 39 together, since the height of the spacer CS illustrated in FIG. 40 where the spacing member 370 is positioned is relatively large, the spacer CS illustrated in FIG. 40 serves as the main spacer, and the spacer CS illustrated in FIG. 39 may serve as the sub spacer.

According to the exemplary embodiment, since the color filters in white 230_W1, 230_W2, and 230_W3 are positioned in the white pixel PX_W, a color coordinate of the white pixel PX_W is easily controlled by controlling an area and the like of the color filters in white 230_W1, 230_W2, and 230_W3.

Next, an example in which the color filter 230 is positioned on the thin film transistor panel 100 will be described with reference to FIGS. 41 to 44. In this case, the light blocking member 220 may be positioned at any one of the thin film transistor panel 100 or the opposed panel 200.

A gate conductor (not illustrated), a gate insulating layer 140, and a semiconductor layer (not illustrated) are sequentially positioned on the substrate 110 of the thin film transistor panel 100, and a data conductor including a data line 171 is positioned thereon. The data line 171 may be almost extended between the adjacent pixels, but is not limited thereto.

A first passivation layer 180a is positioned on the data conductor.

A plurality of color filters 230 is positioned on the first passivation layer 180a. As described above, at least two color filters 230 are formed in the transmitting area of the white pixel PX_W to configure the color filters in white 230_W1, 230_W2, and 230_W3. The portion where at least two of the color filters in white 230_W1, 230_W2, and 230_W3 overlap with each other is called an overlapping portion in white WOP. The lowest color filter of the overlapping portion in white WOP is called a first color filter 230_1, and a color filter positioned at an n-th (n is a natural number of 2 or more) position thereon is called an n-th color filter 230_n. Since an area, a thickness, and the like of the overlapping area of the color filters 230 forming the overlapping portion in white WOP are the same as those described above, the detailed description will be omitted herein.

Even in the exemplary embodiment, the overlapping portion in white WOP may be connected with the portions where the color filters in white 230_W1, 230_W2, and 230_W3 do not overlap with each other and are elongated, and as a result, the stability of the overlapping portion in white WOP may be increased.

A second passivation layer 180b including an organic material may be positioned on the color filters 230. The viscosity of the second passivation layer 180b is properly controlled to control the flatness of the substrate 110. Particularly, according to the exemplary embodiment, since the color filters in white 230_W1, 230_W2, and 230_W3 are formed in the transmitting area of the white pixel PX_W, the upper surface of the second passivation layer 180b is not sunken in the transmitting area of the white pixel PX_W where a separate white filter is not formed. That is, the height of the upper surface of the second passivation layer 180b in the transmitting area of the white pixel PX_W may be substantially the same as the height of the upper surface of the second passivation layer 180b in the transmitting area of the color pixels PX_1, PX_2, and PX_3, and as a result, the flatness on the substrate 110 may be improved.

The color filters in white 230_W1, 230_W2, and 230_W3 are positioned in the white pixel PX_W, a color coordinate of the white pixel PX_W is easily controlled by controlling an area and the like of the color filters in white 230_W1, 230_W2, and 230_W3.

A capping layer 80 may be positioned on the second passivation layer 180b. Unlike this, the capping layer 80 may be omitted.

A plurality of pixel electrodes 191 is positioned on the capping layer 80.

The overlapping portion in white WOP and the second passivation layer 180b thereon have upper surfaces higher than the periphery to form a spacer CS maintaining a cell gap of the liquid crystal layer 3. Accordingly, a separate spacer needs not to be formed to reduce the number of photomasks.

Figure 41:
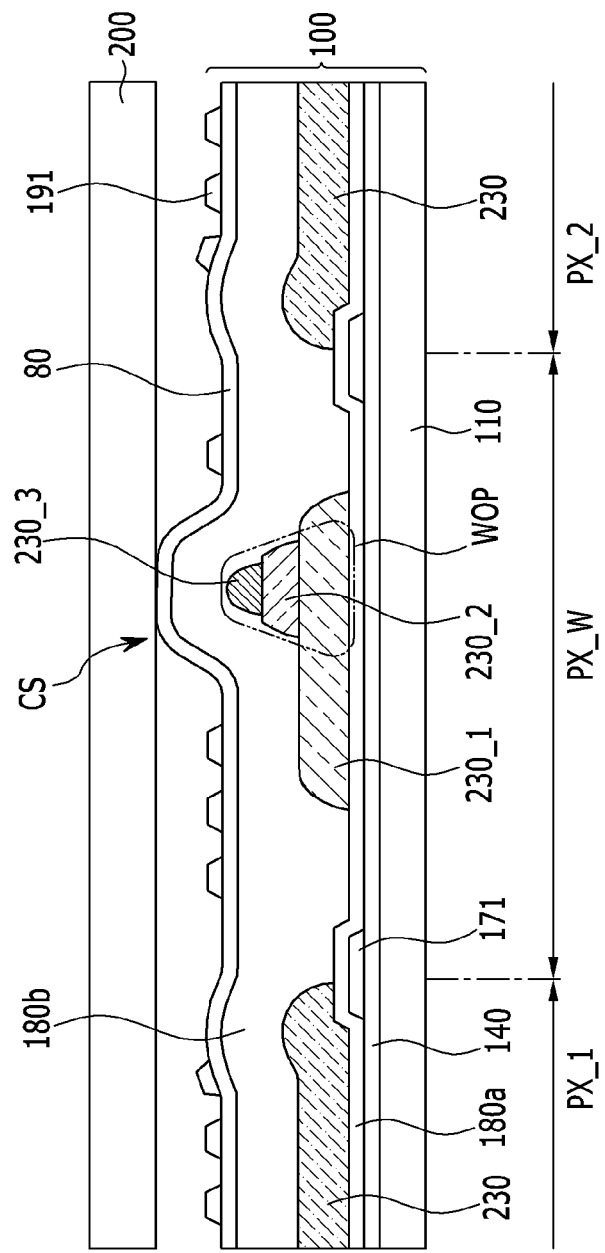
Figure 42:
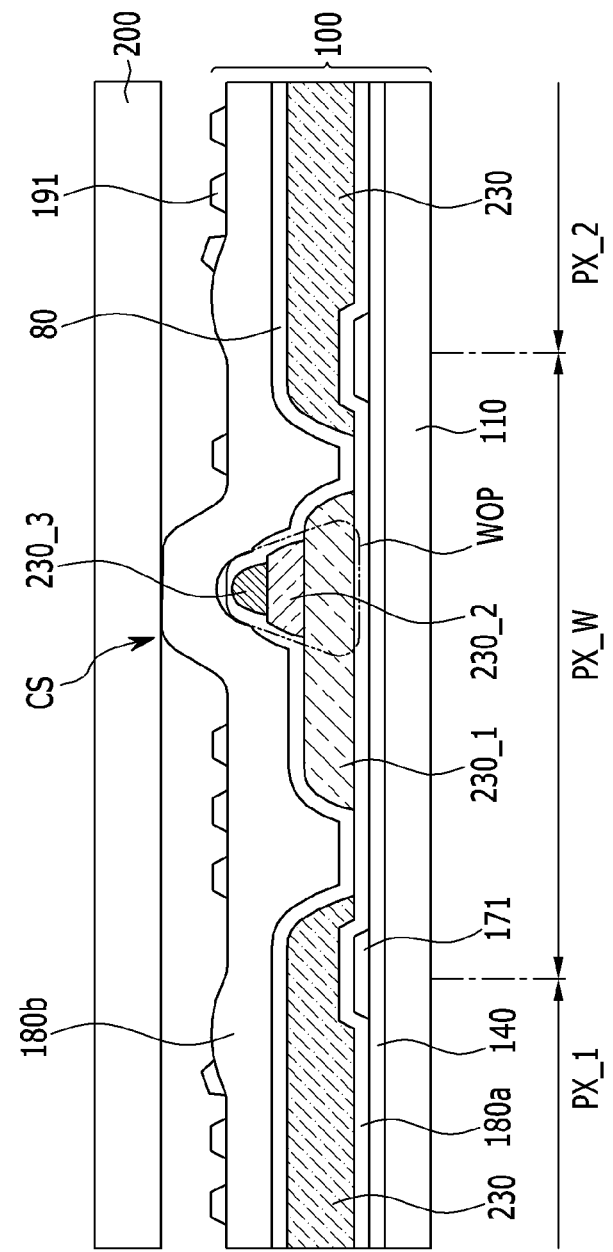

Next, referring to FIG. 42, the thin film transistor panel 100 according to the exemplary embodiment is almost the same as that of the exemplary embodiment illustrated in FIG. 41, but positions of the capping layers 80 may be different from each other. For example, as illustrated in FIG. 42, the capping layer 80 may be positioned on the color filter 230 and below the second passivation layer 180b.

Figure 43:
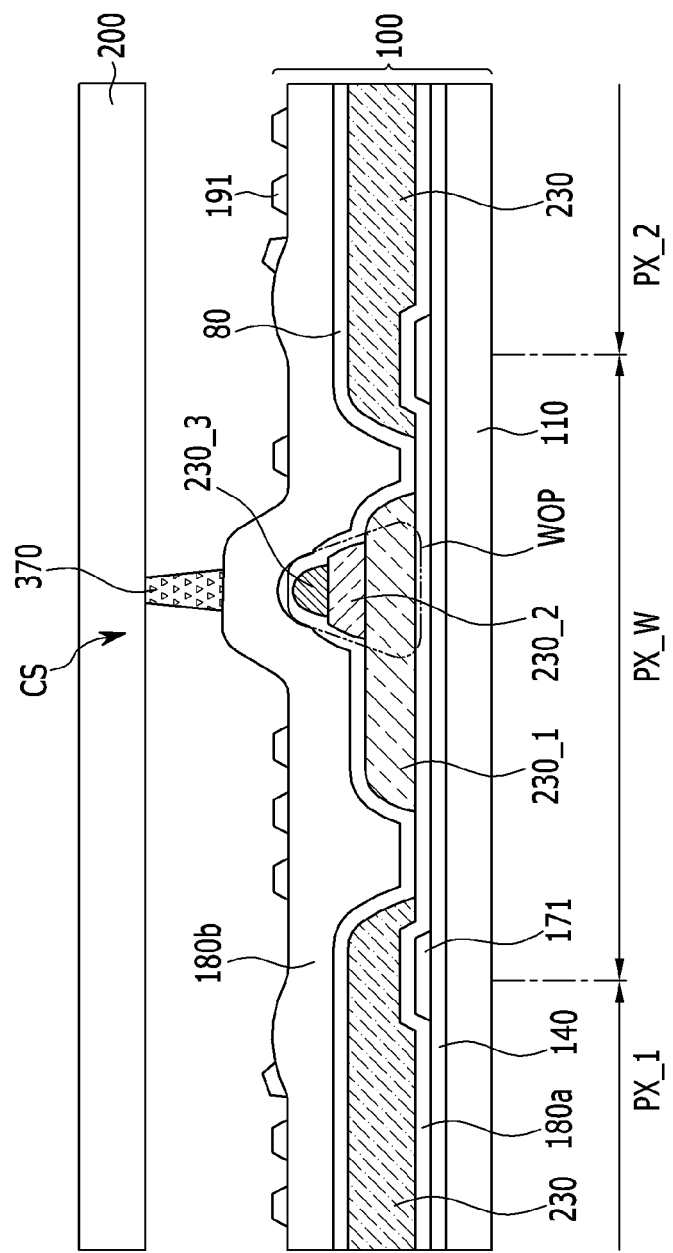

Next, referring to FIG. 43, the thin film transistor panel 100 according to the exemplary embodiment is almost the same as that of the exemplary embodiment illustrated in FIG. 42, but a spacing member 370 may be further positioned on the overlapping portion in white WOP. The overlapping portion in white WOP, the capping layer 80 thereon, the second passivation layer 180b, and the spacing member 370 have upper surfaces higher than the periphery to form the spacer CS. Particularly, in the case of forming the spacer CS illustrated in FIG. 42 together, since the height of the spacer CS illustrated in FIG. 43 where the spacing member 370 is positioned is relatively large, the spacer CS illustrated in FIG. 43 serves as the main spacer, and the spacer CS illustrated in FIG. 42 may serve as the sub spacer.

Figure 44:
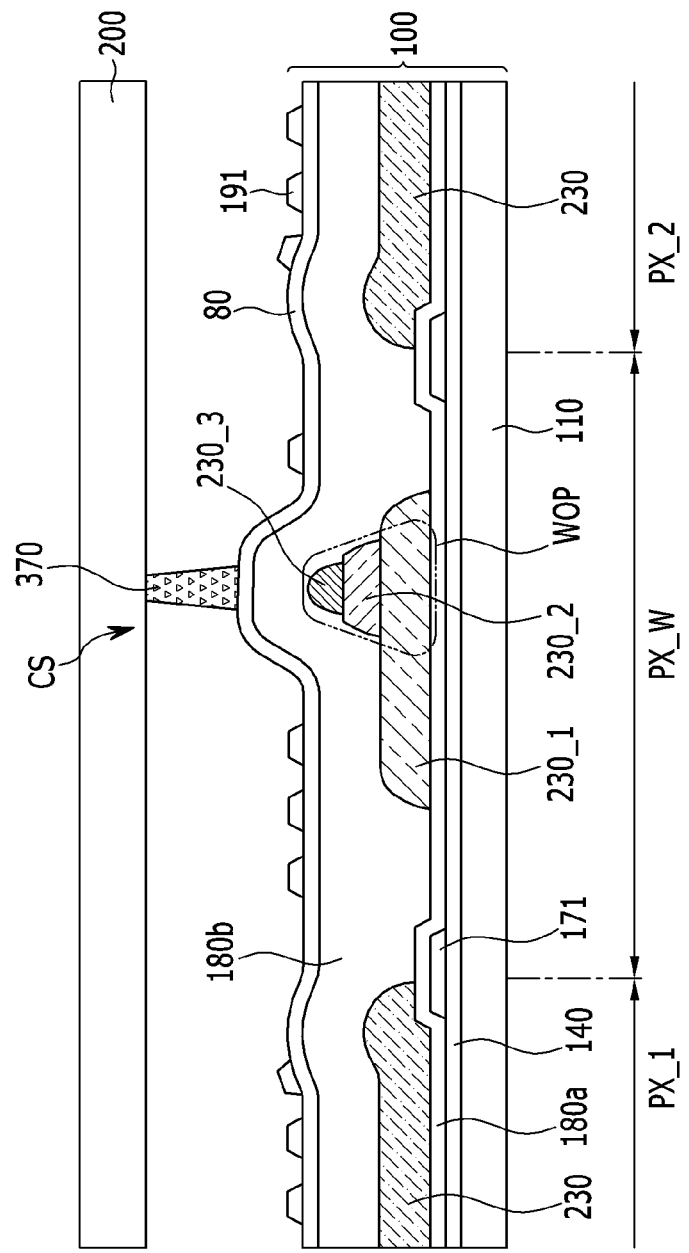

Next, referring to FIG. 44, the thin film transistor panel 100 according to the exemplary embodiment is almost the same as that of the exemplary embodiment illustrated in FIG. 41, but a spacing member 370 may be further positioned on the overlapping portion in white WOP. The overlapping portion in white WOP, the capping layer 80 thereon, the second passivation layer 180b, and the spacing member 370 have upper surfaces higher than the periphery to form the spacer CS. Particularly, in the case of forming the spacer CS illustrated in FIG. 41 together, since the height of the spacer CS illustrated in FIG. 44 where the spacing member 370 is positioned is relatively large, the spacer CS illustrated in FIG. 44 serves as the main spacer, and the spacer CS illustrated in FIG. 41 may serve as the sub spacer.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

80: Capping layer
100: Thin film transistor panel
110, 210: Substrate
140: Gate insulating layer
171: Data line
180a, 180b: Passivation layer
191: Pixel electrode
200: Opposed panel
220: Light blocking member
230: Color filter
270: Opposed electrode
350: Transparent spacing member
370: Spacing member

What is claimed is:

1. A display device, comprising:
a first substrate and a second substrate facing each other;
a plurality of color filters positioned on the first substrate and representing different colors from each other, wherein at least two of the plurality of color filters overlap with each other on the first substrate to form an overlapping portion, and
the overlapping portion forms a first spacer;

a transparent filter positioned on the first substrate and positioned in a transmitting area of a white pixel; and a second spacer including the same material as the transparent filter, wherein the overlapping portion is positioned in the transmitting area of the white pixel.

2. A display device, comprising:

a first substrate and a second substrate facing each other; and a plurality of color filters positioned on the first substrate and representing different colors from each other, wherein the plurality of color filters includes at least two color filters in white positioned in a transmitting area of a white pixel and representing different colors from each other, and two or more of the at least two color filters in white overlap with each other in the transmitting area of the white pixel to form an overlapping portion in white.

3. The display device of claim 2, wherein:

a color filter in white of the at least two color filters in white includes a portion which does not overlap with another color filter in white of the at least two color filters in white and is elongated in the transmitting area of the white pixel.

4. The display device of claim 3, wherein:

elongated portions of the at least two color filters in white are substantially parallel to each other.

5. The display device of claim 4, wherein:

an elongated portion of the elongated portions is connected with the overlapping portion in white.

6. The display device of claim 2, wherein:

the overlapping portion in white forms a spacer.

7. The display device of claim 6, further comprising:

a passivation layer positioned on the plurality of color filters.

8. The display device of claim 7, wherein:

the passivation layer includes an organic material, and wherein a height of an upper surface of the passivation layer positioned in the transmitting area of the white pixel is substantially the same as a height of an upper surface of the passivation layer positioned in a transmitting area of a color pixel.

9. The display device of claim 2, further comprising:

a spacing member positioned on the overlapping portion in white.

10. The display device of claim 2, wherein:

a thickness of a first color filter positioned at a top of the overlapping portion in white is about 30% to about 70% of a thickness of a second color filter positioned below the first color filter.

11. The display device of claim 10, wherein:

a first width of an overlapping region of the first color filter with the second color filter is about 20 μm to about 50 μm.

12. The display device of claim 11, wherein:

the overlapping portion further includes a third color filter positioned below the second color filter, and a width of an overlapping region of the second color filter with the third color filter is larger than the first width.

* * * * *